(12) United States Patent
Yong et al.

(10) Patent No.: US 10,107,070 B2
(45) Date of Patent: Oct. 23, 2018

(54) INTERVENTIONLESS FRANGIBLE DISK ISOLATION TOOL

(71) Applicant: MAGNUM OIL TOOLS INTERNATIONAL, LTD., Corpus Christi, TX (US)

(72) Inventors: Lakhena Yong, Calgary (CA); W. Lynn Frazier, Corpus Christi, TX (US)

(73) Assignee: MAGNUM OIL TOOLS INTERNATIONAL, LTD., Corpus Christi, TX (US)

( * ) Notice: Subject to any disclaimer, the term of this patent is extended or adjusted under 35 U.S.C. 154(b) by 257 days.

(21) Appl. No.: 15/218,457

(22) Filed: Jul. 25, 2016

(65) Prior Publication Data

US 2017/0022783 A1    Jan. 26, 2017

Related U.S. Application Data

(60) Provisional application No. 62/196,706, filed on Jul. 24, 2015.

(51) Int. Cl.
*E21B 34/06* (2006.01)
*E21B 34/10* (2006.01)
*E21B 33/12* (2006.01)

(52) U.S. Cl.
CPC ............ *E21B 34/063* (2013.01); *E21B 33/12* (2013.01); *E21B 34/10* (2013.01)

(58) Field of Classification Search
CPC .................................................. E21B 34/063
See application file for complete search history.

(56) References Cited

U.S. PATENT DOCUMENTS

| 244,042 | A |   | 7/1881  | Farrar |
|---|---|---|---|---|
| 3,102,593 | A | * | 9/1963  | Sizer ....................... E21B 23/02 166/125 |
| 3,533,241 | A |   | 10/1970 | Bowerman et al. |
| 3,831,680 | A |   | 8/1974  | Edwards et al. |
| 4,512,491 | A |   | 4/1985  | DeGood et al. |
| 4,553,559 | A |   | 11/1985 | Short |
| 4,658,902 | A | * | 4/1987  | Wesson ................. E21B 34/063 166/317 |
| 4,683,943 | A |   | 8/1987  | Hill et al. |
| 4,969,524 | A | * | 11/1990 | Whiteley .............. E21B 34/063 166/205 |
| 5,050,630 | A |   | 9/1991  | Farwell et al. |
| 5,607,017 | A |   | 3/1997  | Owens et al. |
| 5,924,696 | A |   | 7/1999  | Frazier |
| 6,076,600 | A |   | 6/2000  | Vick et al. |
| 6,397,950 | B1 |  | 6/2002  | Streich et al. |

(Continued)

*Primary Examiner* — Shane Bomar
(74) *Attorney, Agent, or Firm* — Jackson Walker, LLP

(57) ABSTRACT

A downhole pressure isolation tool is disclosed for use in a tubing string or casing string. The tool includes a frangible disk or seal within a housing having a bore. The disk has a dome section and a cylinder section and the dome of the disk is transverse to the bore. A piston is located between the housing and the cylinder of the disk, the piston movable between a first position and a second position, the second position, engaging a set of fingers which push into the cylinder of the disc to break it, causing the entire disk the cause and the entire disk to fail. A rupturable membrane is provided which, when it ruptures places the piston in fluid communication with a fluid within the bore.

56 Claims, 17 Drawing Sheets

(56) References Cited

U.S. PATENT DOCUMENTS

| | | |
|---|---|---|
| 7,708,066 B2 | 5/2010 | Frazier |
| 7,806,189 B2 | 10/2010 | Frazier |
| 8,602,105 B2 | 12/2013 | Sinclair |
| 8,813,848 B2 | 8/2014 | Frazier |
| 9,194,209 B2 | 11/2015 | Frazier |
| 9,291,031 B2 | 3/2016 | Frazier |
| 9,382,778 B2 | 7/2016 | Frazier |
| 2007/0215361 A1 | 9/2007 | Pia |
| 2007/0251698 A1 | 11/2007 | Gramstad et al. |
| 2009/0020290 A1* | 1/2009 | Ross ............... E21B 34/103 166/317 |
| 2011/0284242 A1 | 11/2011 | Frazier |
| 2011/0284243 A1 | 11/2011 | Frazier |
| 2011/0308819 A1 | 12/2011 | Frazier |
| 2011/0315398 A1* | 12/2011 | Ueland ............ E21B 34/063 166/376 |
| 2013/0048272 A1 | 2/2013 | VanLue |
| 2014/0008085 A1* | 1/2014 | Tinnen ............. E21B 29/00 166/387 |
| 2014/0216756 A1 | 8/2014 | Getzlaf et al. |
| 2015/0090439 A1 | 4/2015 | VanLue |
| 2015/0191990 A1 | 7/2015 | VanLue |
| 2015/0191991 A1* | 7/2015 | Ezell ............... E21B 33/128 166/387 |
| 2015/0233208 A1* | 8/2015 | Muscroft ......... E21B 34/063 166/374 |
| 2017/0284167 A1 | 10/2017 | Takahashi et al. |

\* cited by examiner

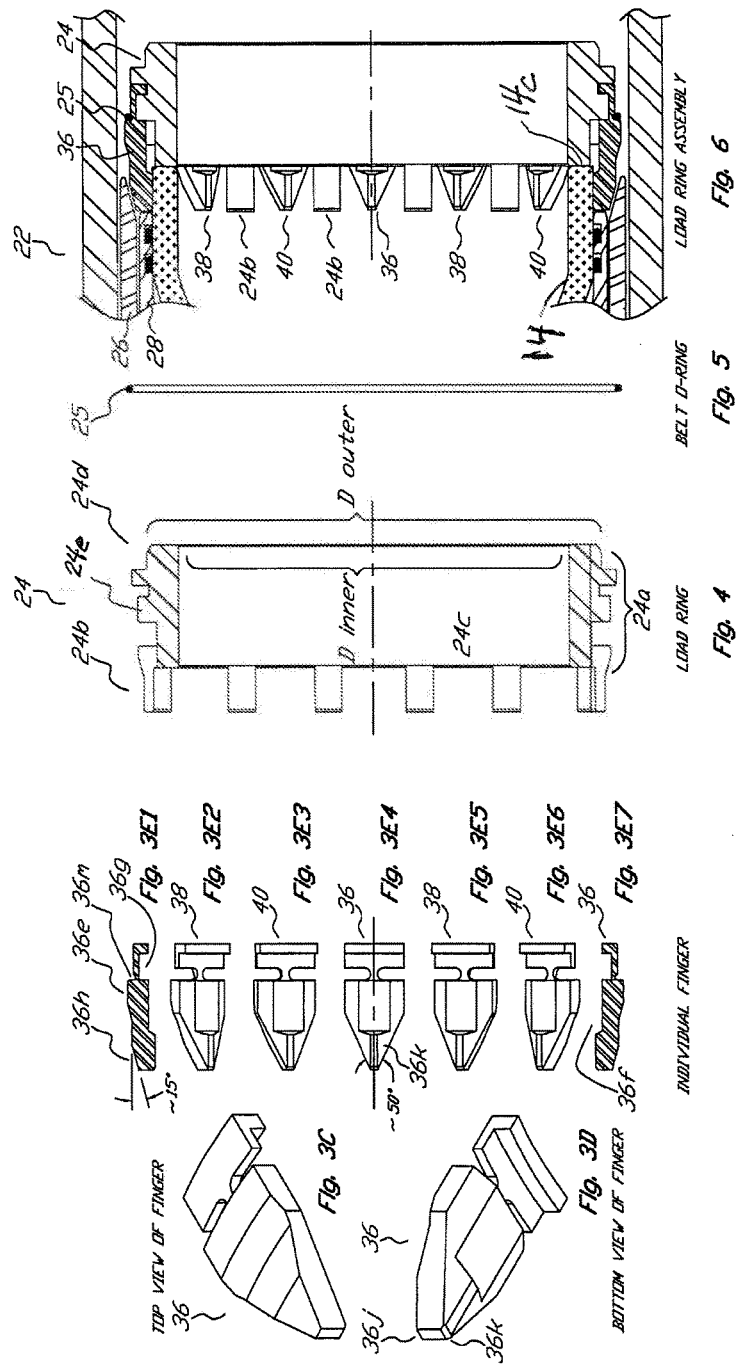

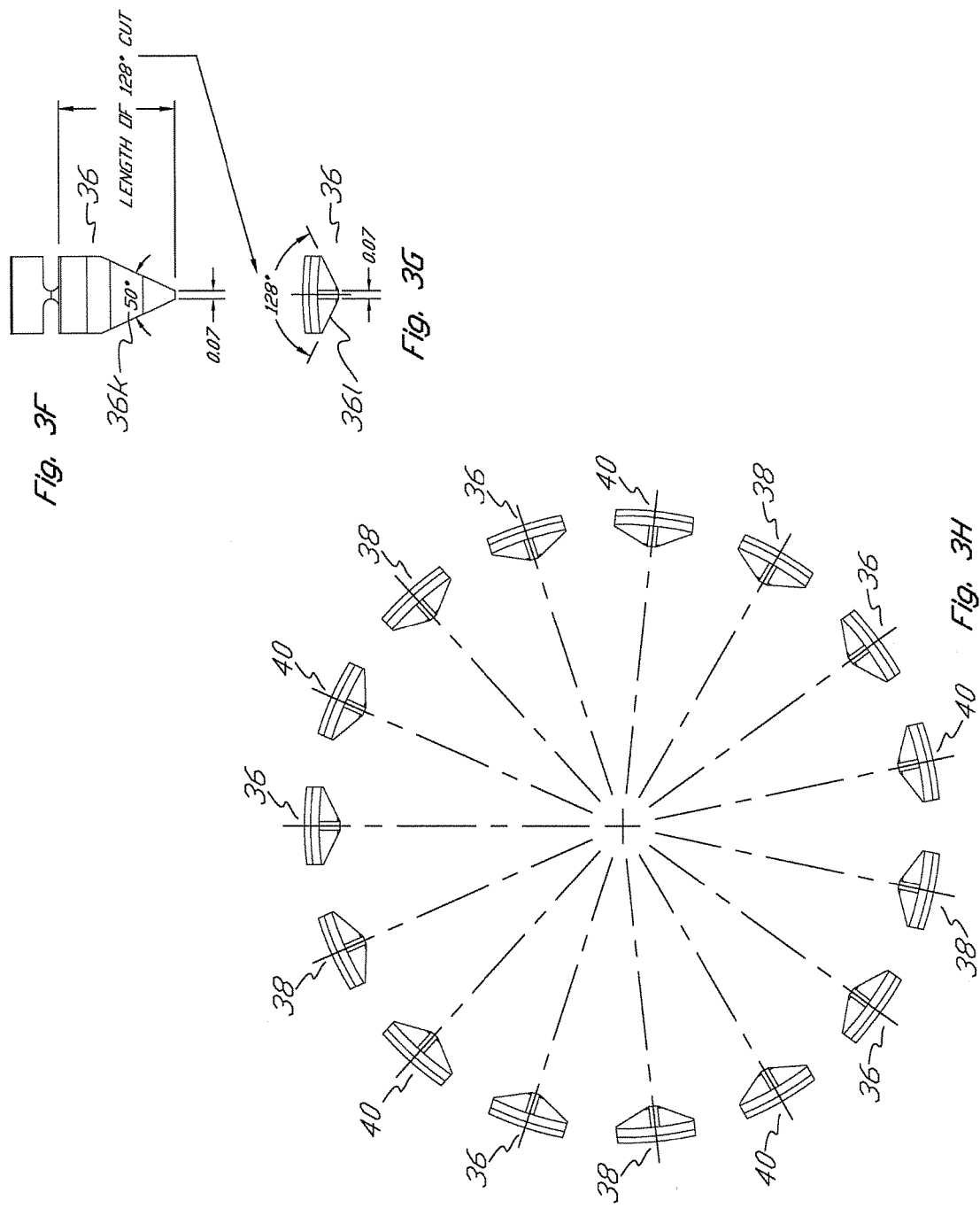

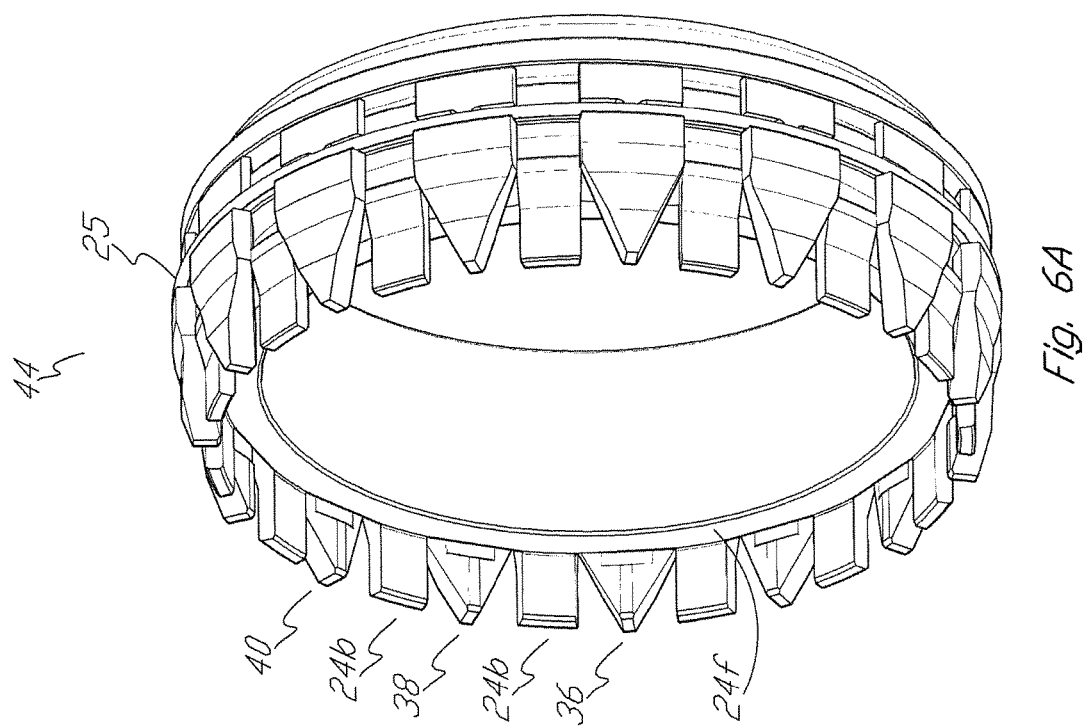

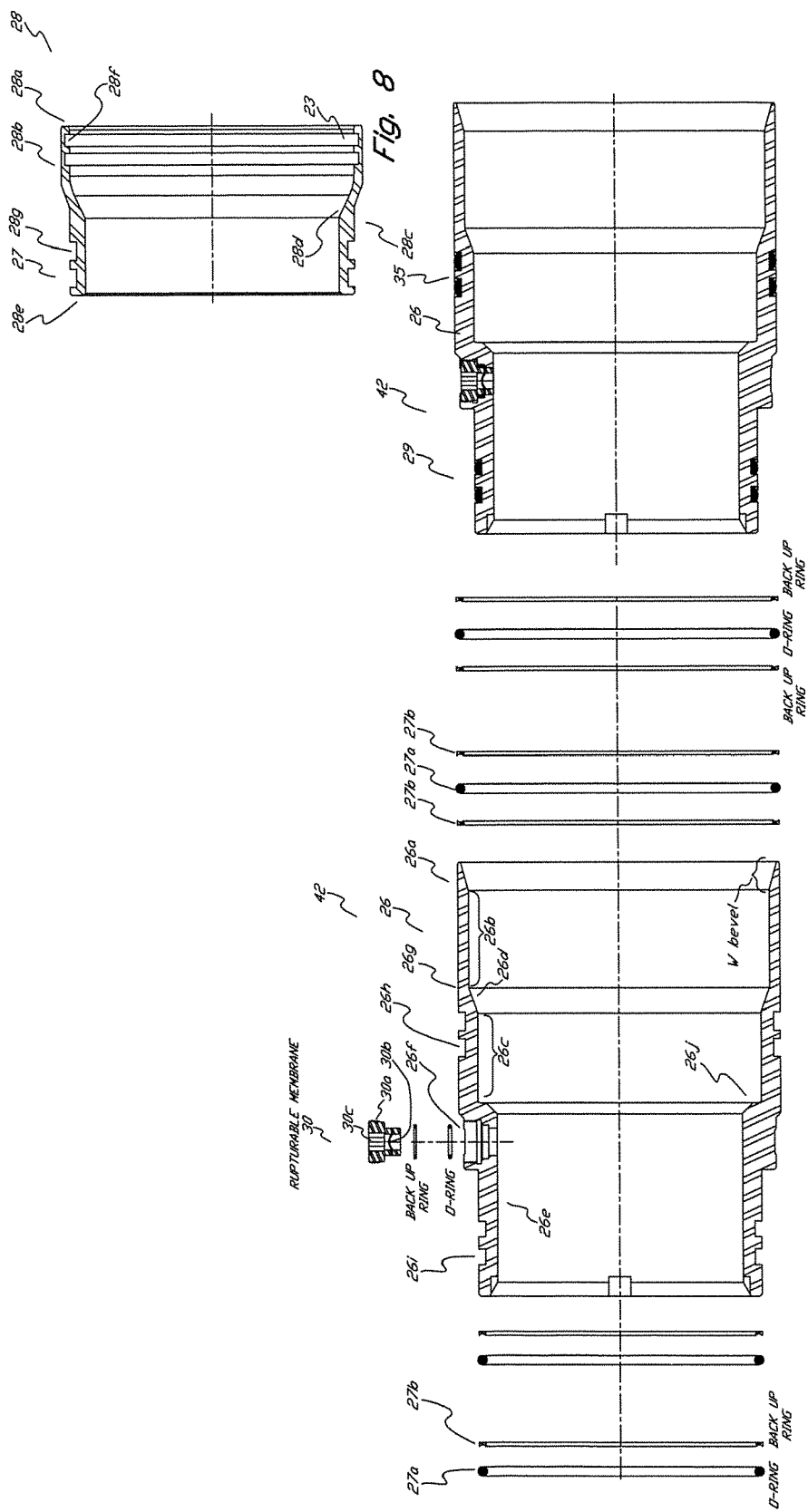

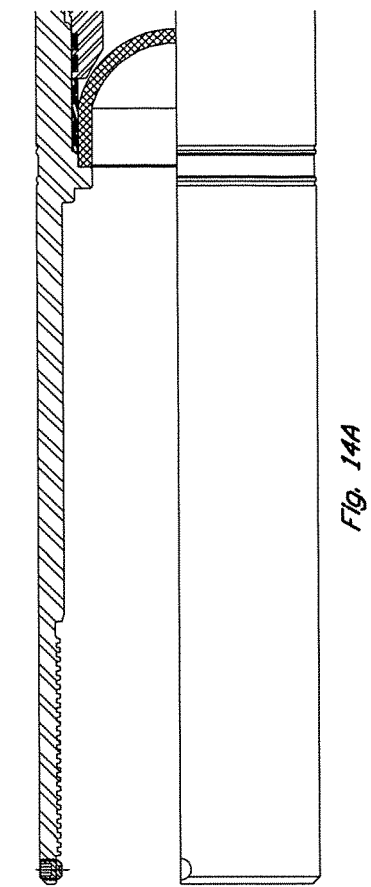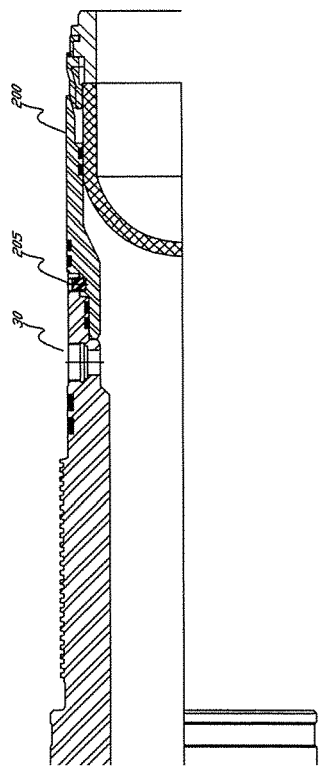
Fig. 14A

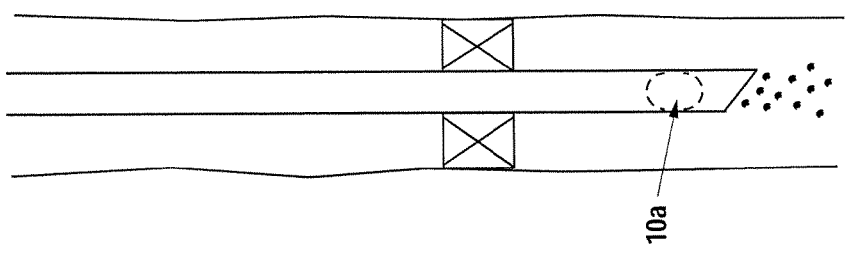
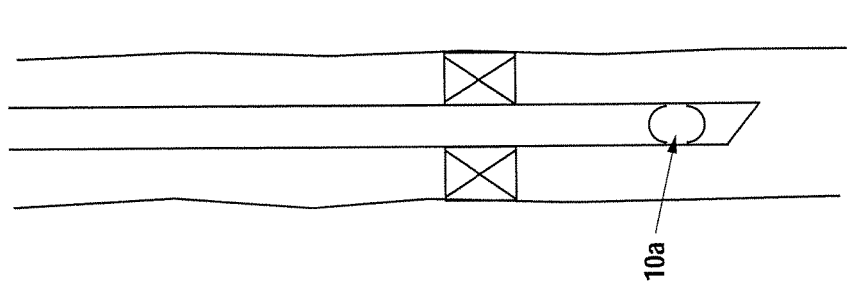
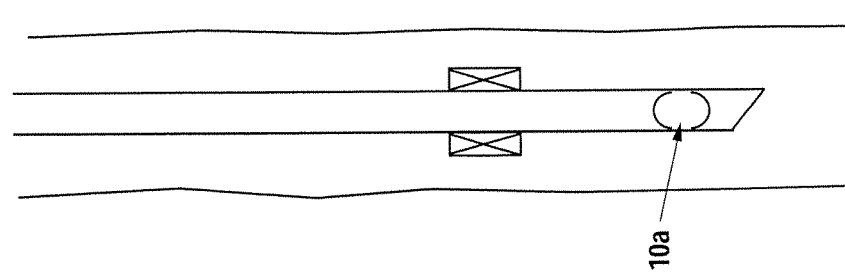

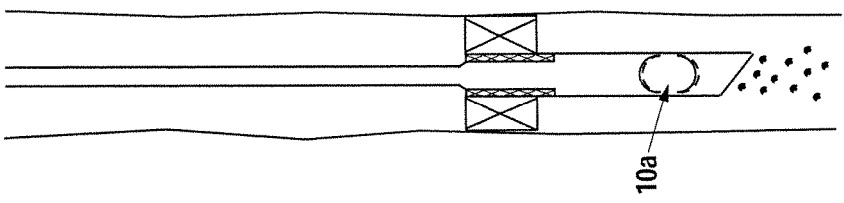
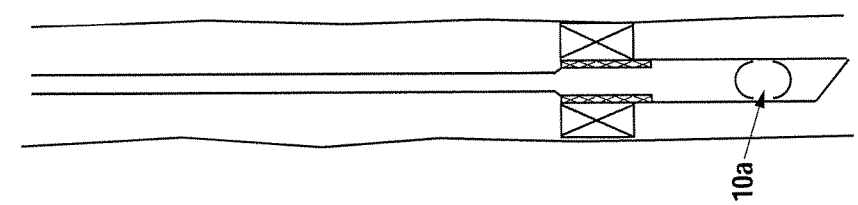
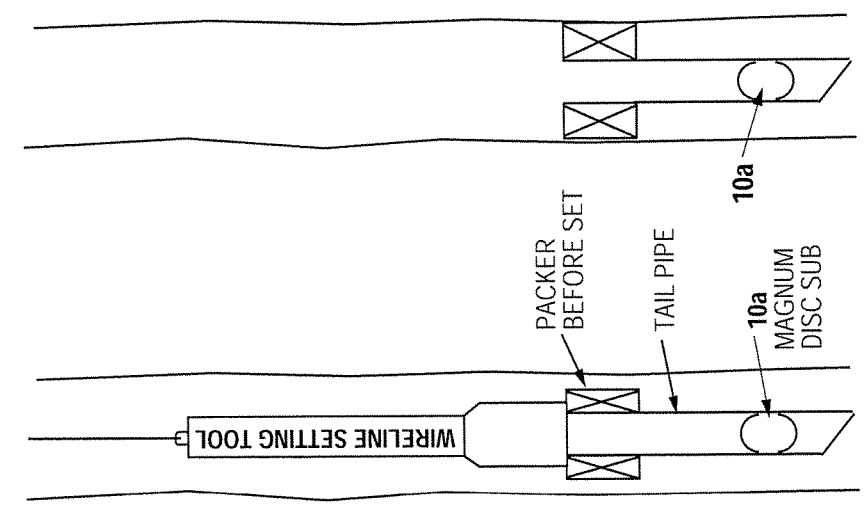

INTERVENTIONLESS FRANGIBLE DISK ISOLATION TOOL

This patent application claims priority from and the benefit of U.S. Provisional Patent Application No. 62/196,706, filed Jul. 24, 2015 and incorporates the same by reference.

FIELD OF THE INVENTION

Downhole pressure isolation tools for use in a tubing string, casing string or other suitable assembly, the downhole pressure isolation tool being activated without an activation or setting tool.

BACKGROUND OF THE INVENTION

Isolation tools are used in oil and gas wells for running in or placement on tubing strings or casing strings for isolation of formations or pressures within the well. Isolation tools may include frangible disks, such as described in U.S. Pat. Nos. 9,291,031 and 5,924,696 and patent publication U.S. Pat. No. 2015/0068730, published Mar. 12, 2015, incorporated herein by reference.

One type of isolation tool has at least one frangible disk and is designed to be broken by dropping a weight or go-devil down the tubing or casing. Such a device is most typically used in vertical wells. However, sometimes isolation tools, such as isolation tools with a frangible disk(s) are intended for use in highly deviated or horizontal wells or wells with a horizontal leg. Such devices may use hydrostatic pressure to shear a disk responsive to a load on the disk, such as set forth in the '730 publication.

SUMMARY OF THE INVENTION

A challenge addressed in some of the disclosed embodiments is how to use a limited additional differential hydrostatic pressure applied from the surface or locally through a wellbore fluid to an isolation tool with a frangible disc to reliably open the isolation tool by causing complete collapse of the frangible disc. An early embodiment punctured a few holes in the frangible disc. However, this did not reliably cause the frangible disc to completely collapse. In other early version embodiments, simultaneously puncturing a sufficient number of holes in the frangible disk to collapse was not reliably accomplished throughout the range of differential pressures likely to be applied through the wellbore fluid to the isolation tool. Lesser pressure differentials provided insufficient power to reliably simultaneously puncture sufficient holes in the frangible disk to reliably cause it to completely collapse.

Some disclosed embodiments employ structures and methods which use the limited additional differential pressure available to be usefully communicated from the surface through a wellbore fluid to open an isolation tool by puncturing a sufficient number of holes in a frangible disc's cylinder wall to cause the frangible disc's complete collapse by using a single piston with a single bevel to cause multiple fingers located on a single load ring to, in some embodiments, sequentially puncture multiple holes in the frangible disc's cylinder wall.

An additional challenge addressed in some of the disclosed embodiments is that actual wellbore fluid hydrostatic pressure on a particular isolation tool in a particular well may vary from the expected pressure. For example, sometimes the isolation tool will be placed at a depth other than the depth projected before beginning drilling operations. A greater depth produces greater hydrostatic pressure on the isolation tool. Some of the disclosed embodiments permit the isolation tool to be modified at the well site to more reliably open responsive to the selected differential hydraulic pressure to be applied to the wellbore's static hydrostatic pressure on the isolation tool as determined at the well site. Some of the disclosed embodiments permit the operator at the wellsite to select a rupture membrane assembly which the operator determines to be best for the isolation tool's actual local conditions and depth from a kit comprised of rupture membrane assembly's designed and constructed to rupture at different pressures.

A downhole well insulation tool is provided in some embodiments comprising: a housing having an upper end and a lower end, exterior walls, and interior walls defining a bore. At least one frangible disk is provided, the frangible disk having outer walls and inner walls, a cylindrical section and a generally hemispherical dome. The frangible disk engages the inner walls of the housing. The dome is convex when viewed from the upper end of the housing. The frangible disk substantially blocks the bore of the housing and defines an upper bore above the frangible disk and a lower bore below the frangible disk. A finger assembly is provided comprising multiple fingers, each finger having a first position and a second position, at least a portion of some of the multiplicity of fingers being adjacent an outer wall of the at least one frangible disk when in a first position. A piston assembly is disclosed for engaging an inner wall of the housing and the frangible disk. The piston assembly comprises at least a piston and "O" rings. The piston includes piston walls. A rupturable membrane is provided, the rupturable membrane rupturing at a membrane rupture pressure. The piston is slideable between a first position and a second position with respect to the inner walls of the housing of the piston assembly. A head space is defined by the housing inner wall, the piston wall and sealing elements there between, the head space including walls defining the rupturable membrane.

The piston of the piston assembly is moveable from the first position when the head space is at a first pressure to a second position, responsive to a second higher head space pressure; wherein the second pressure is greater than the rupture pressure of the membrane; and wherein movement of the piston toward the second position causes the piston to engage the fingers of the finger assembly and move at least some of the fingers located on the load ring from their first position to their second position. This movement of the fingers drives the fingers into the frangible disk with sufficient force to break the frangible disk.

In prior art pressure responsive disk breaking sliding sleeves, shear pins are typically used to hold the sliding sleeve in place. When the hydrostatic pressure in the bore exceeds the preset shear pin minimum, the shear pins shear causing the sleeve to move downward and to directly contact the dome of the disk. Here, an increase in bore hole fluid hydrostatic pressure pushes an upward face of a piston, which achieves breakage of the disk through the piston forcing fingers into contact with and through the cylindrical section of the disk. Here the piston contacts multiple third members, the fingers, and the fingers are, in turn, urged against the disk. The fingers act on the weakest portion of the disk, the columnar section or the cylindrical section, which is under downward compression force. As the fingers bear on the outer cylindrical surface, the downward sliding force of the piston is translated into a force normal (perpendicular)

to drive the angled heads of the fingers against and through the outer wall of cylindrical section of the disk.

Shear pins typically are not accurate in shearing at a predetermined shear force. In larger tools that use a large number of shear pins, the inaccuracy of a single shear pin is compounded. The more shear pins, the greater the inaccuracy of the actual shear force activating the sliding sleeve compared to the desired shear force. Shear pins may shear sequentially, temporally spreading the hydrostatic impact on the piston. Not only does a described embodiment use a piston that indirectly, through fingers, applies a transverse force on the cylindrical section, it provides a "floodgate" or sudden application of pressure against the piston and cylinder upon rupturing the pressure membrane. In most prior art sliding sleeves, the sliding sleeve disk shattering members feel a relatively slow buildup of hydrostatic bore pressure urging them toward the disk. Applicant's disk shattering mechanism is largely unaffected by hydrostatic pressure changes (the piston does not "feel" incremental buildup of hydrostatic pressure) until a membrane ruptures. Then there is a sudden, violent increase in the hydrostatic pressure felt by the piston, directing it toward the finger elements which transversely shatter the disk.

A method for operating a wellbore is provided, the method comprising in one embodiment: selectively placing a tool at a preselected depth in the wellbore. The tool includes a housing having a bore and a frangible disk with an upper and a lower surface. The dome of the frangible disk is transverse to the bore. A piston assembly engages the housing and the frangible disk. Fingers are provided for engaging the piston assembly. The piston assembly includes a slideable piston with a rupturable membrane, the slideable piston configured to move from a first position to a second position at a preselected pressure, the preselected pressure being above the rupture membrane pressure of the rupturable membrane. The well bore above the upper surface of the frangible disk of the tool and the rupturable membrane is loaded with a fluid generating a hydrostatic load. They hydrostatic load is less than needed to rupture the rupturable membrane or cause the frangible disk to fail. Applying an additional load to the hydrostatic load, the additional load plus the hydrostatic load exceeds the rupture membrane pressure, the disk ruptures, and the full hydrostatic impacts the piston which causes the piston to move from its first position to the second position, which movement causes the fingers to move transversely against and rupture the frangible disk, thereby opening the bore for fluid to pass there through.

A tool for temporarily isolating zones in a wellbore, comprising a housing having a bore, a frangible seal within the bore, comprising a dome and a cylinder, the dome transverse to the bore, convex from above the seal, and in an unbroken state blocking fluid from flowing downward from an upper wellbore zone above the tool through the bore to a lower wellbore zone below the tool, the cylinder in an unbroken state supporting the dome against hydrostatic pressure on the dome from the upper zone of the wellbore, a piston located at least in part between the housing and the cylinder, the piston axially movable between the housing and the cylinder, the piston having an upper face, a rupturable membrane in fluid communication with and the bore above the dome and the upper face of the piston, the membrane rupturable at a first hydrostatic pressure on the membrane which is less than a second hydrostatic pressure on the tool which second hydrostatic pressure would rupture the dome, the rupture of the membrane putting the upper face of the piston in fluid communication with the upper zone of the wellbore, a multiplicity of fingers located at least in part about an outer face of the cylinder; wherein the tool is capable of isolating the lower zone in the wellbore below the tool from the upper zone in the wellbore above the tool and ending the isolation upon upper zone fluid hydrostatic pressure exceeding the first hydrostatic pressure, rupturing the membrane, allowing an upper zone hydrostatic fluid to flow through the ruptured membrane and pushing the piston axially downward, the downward moving piston causing the fingers to move transversely inward, the inward moving fingers breaking the cylinder, causing the dome to break, the broken dome opening the bore, permitting fluid communication between the upper zone of wellbore and the lower zone of the wellbore.

A method of temporarily isolating zones in a wellbore, comprising placing a temporary isolation tool in a wellbore to isolate a lower wellbore zone below the tool from an upper wellbore zone above the tool, the tool comprising a housing having a bore, an upper frangible seal within the bore, comprising a dome and a cylinder, the dome transverse to the bore, convex from above the seal, and blocking fluid from flowing downward through the bore, the cylinder supporting the dome against a first upper zone hydrostatic pressure on the dome when the tool is used to isolate zones in the wellbore, a piston having an upper face, the piston located at least in part between the housing and the cylinder, the piston axially movable between the housing and the cylinder, a rupturable membrane between the bore above the upper frangible seal and the upper face of the piston, the membrane rupturable responsive to a second hydrostatic pressure on the membrane which is greater than the first upper zone hydrostatic pressure and which is less than a third upper zone hydrostatic pressure on the tool which third upper zone hydrostatic pressure would rupture the dome, rupture of the membrane putting the upper face of the piston in fluid communication with the upper zone, a multiplicity of fingers located at least in part about an outer face of the cylinder, placing the first preselected hydrostatic pressure on the upper frangible seal of the tool, increasing the first hydrostatic pressure on the tool to the second hydrostatic pressure on the tool, thus exceeding the membrane's rupture pressure and rupturing the membrane; and flowing an upper zone fluid through the ruptured membrane to the upper face of the piston.

BRIEF DESCRIPTION OF THE DRAWINGS

FIGS. 3A, 3B, 3C, and 3D are top, side, and perspective from the top and perspective from the bottom views of the fingers, with FIG. 3B showing the interaction between the fingers, the cartridge, and the piston.

FIGS. 3E1, 3E2, 3E3, 3E4, 3E5, 3E6, and 3E7 together comprise a cross-sectional view of the fingers of a finger assembly comprising multiple (here 12 total) spaced apart fingers, but without the load ring of FIGS. 4 and 6, which helps hold the fingers apart. The fingers are shown positioned with respect to one another when installed on the tool.

FIGS. 3F and 3G are top view and front elevation views of a nose.

FIG. 3H is a bottom view of the fingers showing their spacing about the cartridge (not shown).

FIG. 4 is a side cutaway view of the load ring.

FIG. 5 illustrates the belt "O" ring.

FIG. 6 is a side cutaway detail view of the manner in which a piston assembly engages the housing and the fingers, the piston of the piston assembly in a first position.

FIG. 6A is perspective view of the finger assembly, the fingers in a second position following the fracture of the disk.

FIG. 7A is an exploded cross-section view of the parts comprising the piston; FIG. 7B is the piston assembled in cross-section.

FIG. 8 is a cross-sectional view of the piston cartridge.

FIG. 15 illustrates an embodiment of applicant's tool used to float casing in.

FIGS. 16A, B and C illustrate an embodiment of applicant's tool used on a tubing string with a hydraulically set packer.

FIGS. 17A, B, C and D illustrate an embodiment of applicant's tool used on a BHA including a packer and a tail pipe.

DETAILED DESCRIPTION OF THE ILLUSTRATED EMBODIMENTS

One of the functions of Applicants' interventionless disk sub or downhole tool 10 is to provide, in a first condition, the maintenance of fluid pressure in a tubular or casing string and, responsive to an increase in such pressure, providing for partial or total elimination of a borehole blockage to allow fluid communication through tool 10 and the tubular or casing string. Moreover, one of its functions is to do this without the need for physically engaging the tool with another tool (i.e., "interventionless"), such as a drop bar or go-devil dropped from the surface or coiled tubing. Some of the various embodiments of Applicants' tool utilize a pump applied pressure increase above hydrostatic to move a piston 26 which in turn moves fingers 36/38/40 to break a rim or cylindrical section 14a of a frangible seal or disk 14, frangible disk 14 being previously in an unbroken condition blocking a borehole through a tubular or casing.

Figure 1:
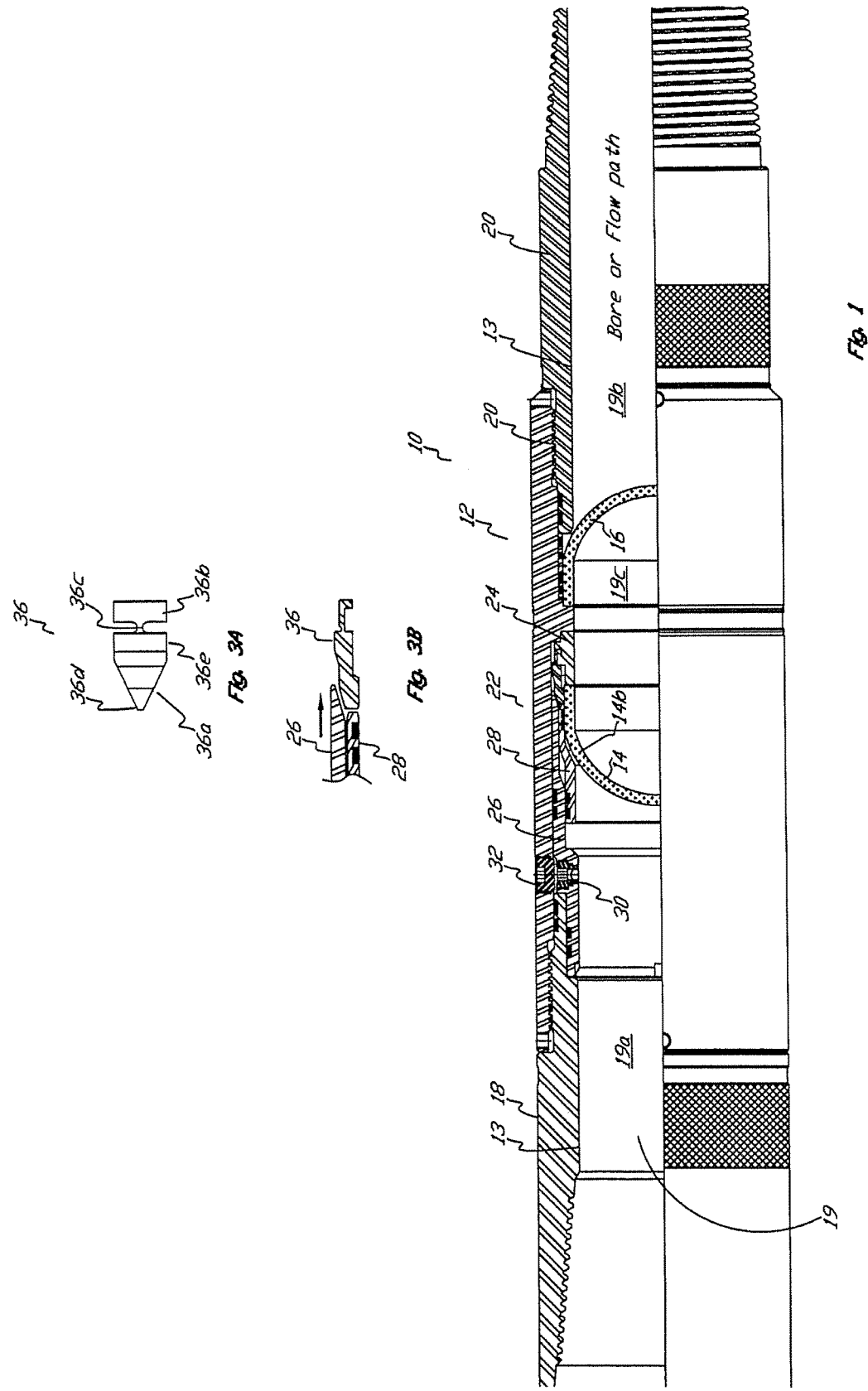
FIG. 1 is a partial cutaway view of an embodiment of an interventionless tool in a first position or pre-deployed post
Figure 2:
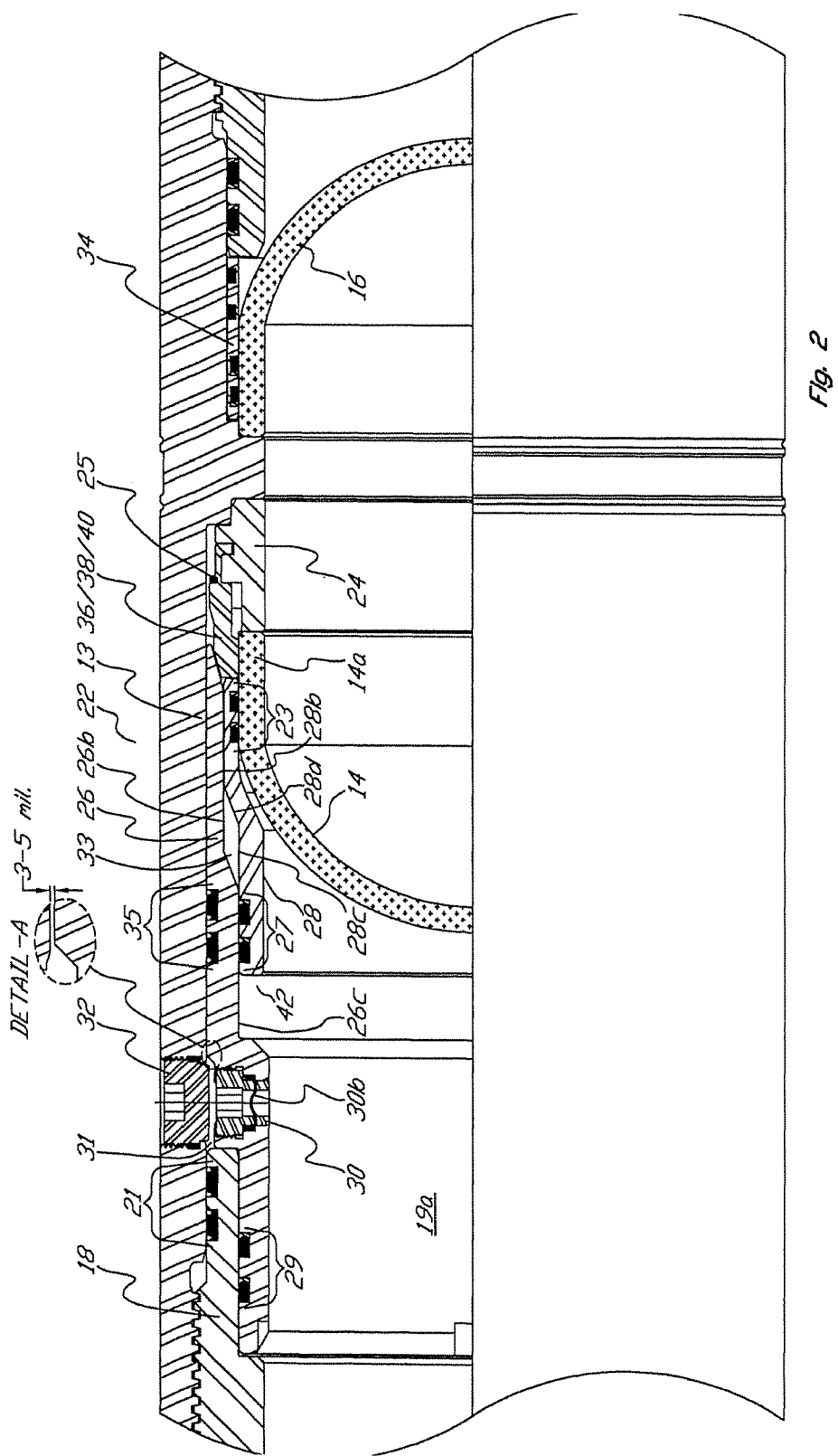
FIG. 2 is a close-up of part of the cross-section of FIG. 1.
Figure 2A:
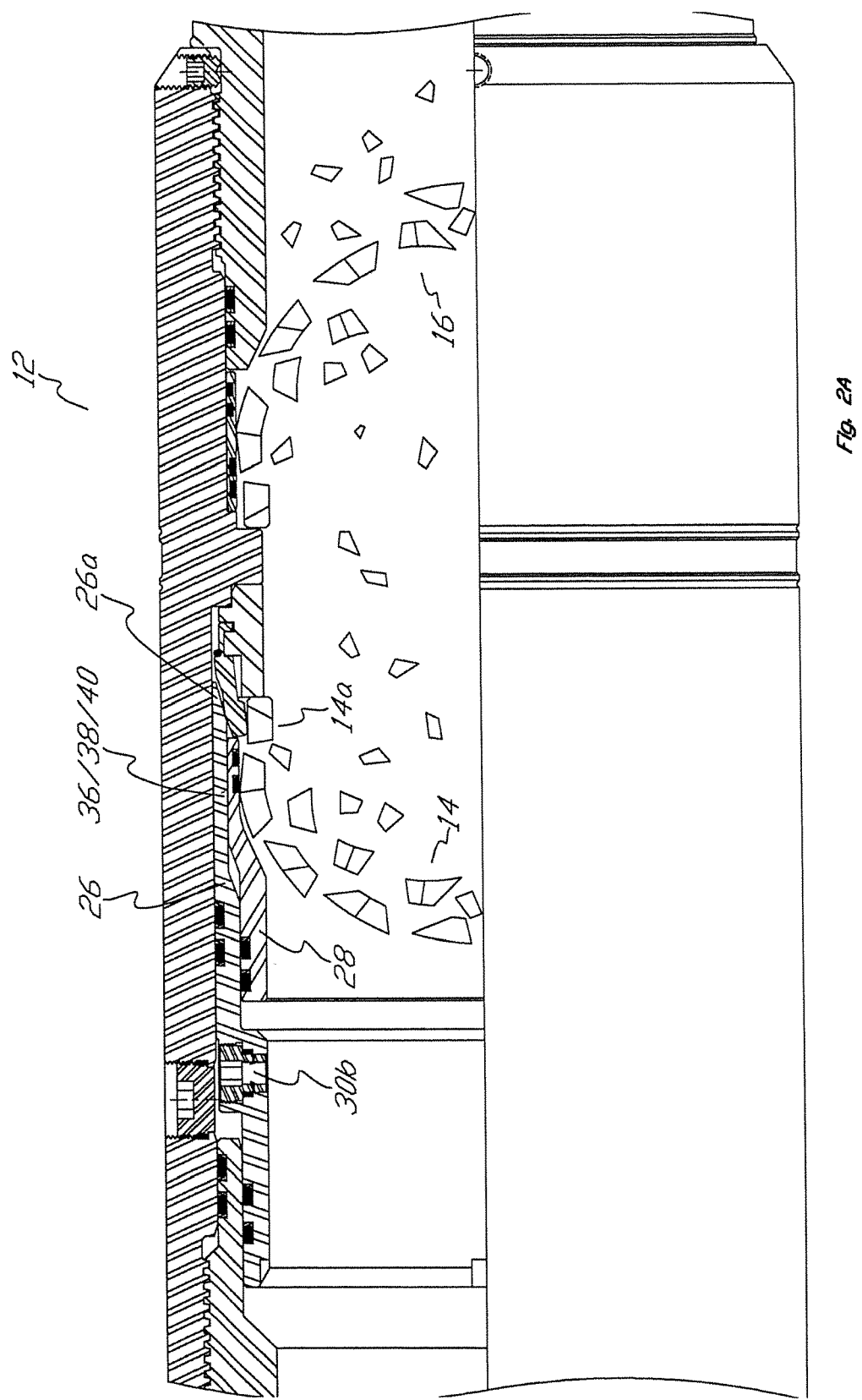
FIG. 2A is a close-up of the tool as the piston moves to a second, released, or deployed position shattering a disk.

With this in mind, Applicant turns to FIGS. 1, 2, and 2A to explain the construction and function of Applicant's interventionless downhole tool 10. Applicant's interventionless downhole tool or sub disk 10 is provided having a housing 12 that may be comprised of a central portion 22 coupled to a lower coupling 20 and an upper coupling 18 by threading connections. Exterior or interior portions of housing 12 may also be threaded for threaded engagement with a casing string, tubing or other tubular element as set forth in further detail below or as known in the art. Upper coupling 18 refers to the coupling closer to the wellbore surface or "uphole". Lower coupling 20 is "downhole."

Some interior walls 13 of housing 12 and the other elements seen in FIG. 1 define a flow path or bore 19. An upper frangible disk 14 transverse to bore 19 is captivated within housing 12 in an unbroken position blocking bore 19. In one embodiment, an additional lower frangible disk 16 is set in bore 19. The space in bore 19 above upper frangible disk 14 may be termed upper bore 19a and the space below upper frangible disk 14 may be termed lower bore 19b. If lower disk 16 is used, lower bore 19b may have intermediate bore 19c, which is between two frangible disks 14/16.

Upper frangible disk 14 has ledge or cylindrical section 14a and hemispherical dome 14b. Upper disk 14 is typically convex when viewed from the top down. Lower disk 16 is typically concave when viewed from the top down and has similar ledge and dome portion (unnumbered). Lower frangible disk 16 may be held in place by lower disk seal ring 34 having O-rings with structure known in the art.

Inside housing 12 are a cylindrical piston 26 (see FIGS. 7A and 7B) and a piston cartridge 28 (see FIG. 8), the two cooperating together to form a piston assembly 42 (see FIG. 2). Also within housing 12 is located load ring 24 which engages a multiplicity of fingers 36/38/40, which fingers may have different numbers and shapes; here, in one embodiment three, thus designations 36/38/40. Load ring 24 and fingers 36/38/40 comprise finger assembly 44 (see FIG. 6A). Finger assembly 44 has at least a multiplicity of fingers. In FIGS. 1 and 2, it is seen that both the piston assembly 42 and the finger assembly 44 are engaged with outer walls of cylindrical section 14a of upper frangible disk 14. Moreover, it is seen that, in comparing FIG. 2 to FIG. 2A, the movement of piston 26 from a first or pre-deployed position as illustrated in FIG. 2, to the right as illustrated in FIG. 2A, showing a second, deployed position of piston 26 will cause piston 26 to "wedge" between inner walls 13 of housing 12 and an outer portion of the fingers 36/38/40 to force the fingers into the outer side walls of cylindrical section 14a. This forces these walls inward causing cylindrical section 14a to shatter, which causes frangible disk 14's dome 14b to fail.

A few things may be appreciated with respect to the drawings. First, piston 26 is driven from the left in FIG. 2 to the right in FIG. 2A responsive to sufficient hydraulic or fluid pressure in head space 31. It is seen that when disk sub 10 is positioned in the casing and before it is initiated piston assembly 42 may be comprised of piston 26 and a piston cartridge 28 and that the walls of piston 26 include a rupturable membrane assembly or Fike fitting 30, which rupturable membrane assembly 30 includes a rupturable membrane 30b. The location of O-ring sealing sets 21/29/35, isolate head space 31 from the downhole hydrostatic pressure in upper bore 19a as shown in FIG. 2. Likewise, gap 33 between piston 26 and cartridge 28 is isolated from downhole hydrostatic pressure in upper bore 19a. When a selected additional fluid pressure load is added to the downhole hydrostatic pressure at disk sub 10 as with, for example, a pneumatic pump P (see FIG. 10) then the pressure in upper bore 19a exceeds the selected known rupture pressure of rupturable membrane 30b. Rupture permits fluid to flow into head space 31 and, acting as an unbalanced force against piston 26 and at the upper ring of O-ring sealing set 35, force piston 26 to the right, from its first position as illustrated in FIG. 2. This moves piston 26 toward its second position as seen in FIG. 2A and causes the upper disk to break.

A second feature which may be appreciated from reviewing the specification is that engagement of piston 26 with fingers 36/38/40 provides a force approximately normal to the outer walls of cylindrical section 14a (not on the dome)

and near the lower end thereof (see FIG. 2), at a point where disk 14 is easier to break than applying a force, for example, to dome 14b or higher up on the cylindrical section. Moreover, with reference to FIGS. 9A, 9B, and 9C, it may be seen that fingers 36/38/40 may, in one embodiment, be provided in differing thicknesses and nose geometry as set forth in more detail below. This exemplary difference in the geometry between the three fingers shows that piston 26, advancing from its first position toward its second position (FIGS. 2 and FIG. 2A and see FIGS. 9A-9C), will first encounter first set of fingers 36 and, incrementally, then a second set of fingers 38, and, incrementally, then a third set of fingers 40 as piston 26 advances between its first and second positions. By such sequential engagement, the full force of piston 26 is engaged with only a fraction (here ⅓) of the fingers at a time (see FIGS. 3H and 6). First set of fingers 36 to start disk 14 breakage and therefore release a back pressure against the advancing piston, which then encounters a second set of fingers 38, in which the almost full pressure or full pressure or force of the piston will come to bear, which second set will meet an already breaking disk cylindrical section 14a that is already beginning to splinter under the cracks generated by first set of fingers 36. Fingers 38 and 40 provide sequential breakage across the cylindrical section which ultimately fractures as seen in FIG. 2A.

It is seen that access is provided to rupturable membrane assembly or fitting 30 through an access plug 32 provided through housing 12 directly adjacent rupturable membrane assembly or fitting 30. Moreover, it is seen that rupturable membrane assembly 30 may have threaded walls 30a and a tool receiving head 30c, so when access plug 32 is removed, a tool may be provided to thread out fitting 30 and replace it with another fitting 30, which may have a different rupturable membrane 30b. Rupturable membrane assembly 30 can be provided at the wellsite with in a set of many rupturable membranes 30b, that differ in the ratings or pressure ratings at which rupturable membrane 30b will burst. This set and process may be used to provide a selected membrane 30d that will rupture at a selected pressure.

In one embodiment, a multiplicity of rupturable membranes assemblies 30 are provided that differ in their pressure ratings. They may be provided as a set in a kit, the sets' members sequentially increasing in their rupture pressure. The rupture membranes selected for the particular set provided to the particular well may be those most likely to be selected for use at the well or well site area. By providing such a set at the wellsite, an operator may selectively determine the pressure at which he wishes piston 26 to deploy, break disk 14 and open disk sub or isolation tool 10 to fluid flow. The operator may determine the vertical depth at which he wishes to place disc sub or isolation tool 10 and determine fluid or hydrostatic pressure above upper frangible disk 14. A typical frangible disk 14 can withstand a very high hydrostatic load, typically 15,000-20,000 psi. Then the operator selects a rupturable membrane assembly 30 that ruptures at a pressure greater than the hydrostatic pressure at the selected depth by a selected psi amount, for example, a psi in the range of about 400 to 4000 psi greater than the wellbore's hydrostatic psi at that depth. The operator may place the selected rupturable membrane assembly or fitting 30 in downhole tool 10, insert tool 10 in a casing or tubing string, run tool 10 in, and then run number of operations about tool 10, using it to isolate the zones above and below it, some operations of which are set forth herein. The operator having used tool 10 for its intended isolation purposes may then rupture membrane 30b by pumping additional pressure upon the wellbore fluid, which additional pressure plus the wellbore fluid's static hydrostatic pressure will cause rupturable membrane 30b to burst, activating piston 26, moving fingers 36/38/40 against frangible disk 14, breaking it, and opening disk sub 10 to flow through its bore 19.

Applicant will turn now to an explanation of the manner in which piston assembly 42, containing piston 26 and, optionally, a piston cartridge 28, operates and then turn to the elements of finger assembly 44 and how they conclude the operation of breaking frangible disk 14 as seen in FIG. 2A. Reference to FIGS. 2, 6, 7A, 7B, 8, 9A, 9B, and 9C illustrate a species of a structure and a manner of the elements functioning.

Figure 9C:
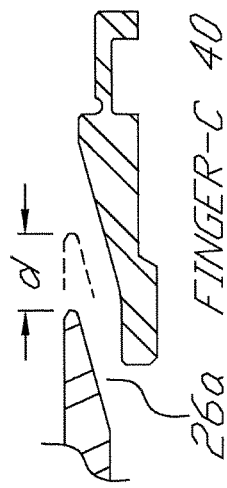
FIGS. 9A, 9B, and 9C illustrate cross-sectional views of three finger configurations 36, 38, and 40.
Figure 9B:
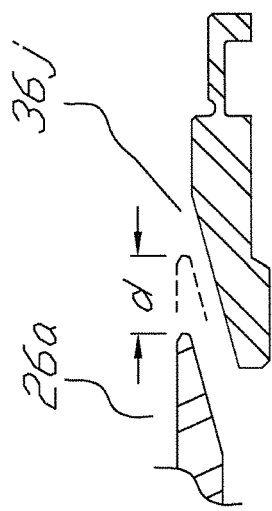
Figure 9A:
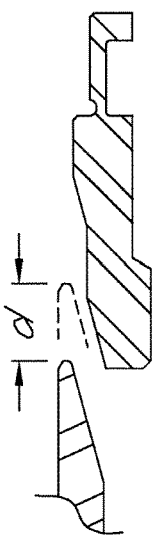

Turning to FIGS. 7A, 7B, and 8 (cartridge), piston assembly 42 is seen to include at least a piston 26 and one or more "O" rings. Piston 26 may have a beveled leading edge 26a with bevel W, a first bearing surface 26b, a second bearing surface 26c, sloped section 26d, a stepped down section 26e, a threaded hole 26f for a fitting referred to as the rupturable membrane assembly 30, an exterior surface 26g, "O" ring seal grooves 26h/26i, and inner shoulder 26j. Beveled leading edge 26a is beveled with a bevel or slope W that will approximately flushly engage the outer surface of head 36a of fingers 36/38/40 as best seen in FIGS. 9A, 9B, and 9C. Much or all of piston 26 may be coated with a coating that will help lubricate the piston as it slides. One such coating is Xylan 1052 (green), that is normally used for corrosion resistance in downhole environments, but which application has discovered is a good dry lubricant. First piston bearing surface 26b is seen to ride on first bearing surface 28b of piston cartridge 28 when piston 26 moves from the first to the second position (see FIGS. 2 and 2A). Second piston bearing surface 26c is seen to ride on second bearing surface 28c of piston cartridge 28 when piston 26 moves from the first to the second position (compare FIG. 2 to FIG. 2A). Sloped section 26d of piston 26 and sloped section 28d of piston cartridge 28 help define space or gap 33, which gap 33 allows piston 26 to be spaced apart from the cartridge 28 in the first position (see FIG. 2). Stepped down section 26e, is stepped down compared to the section below or to the right of rupturable membrane assembly 30, and helps provide for an imbalance in pressure when rupturable membrane 30b bursts, which imbalance forces piston 26 from the first position as seen in FIG. 2 to the right and the second position as seen in FIG. 2A. Most of exterior surface 26g lays against the housing 13 inner walls as seen, for example, in FIG. 2. Shoulder 26j also helps provide a stop, along with other elements of the device, as piston 26 moves from the left to the right.

Turning to the multiple O-ring sealing sets, they may be used at 21/23/27/29/35 and other places. When used, they typically comprise an elastomeric cylindrical O-ring 27a and a stiff PEEK or other suitable material backup ring 27b on either side of O-ring 27a in ways known in the art (see '730 incorporated by reference herein).

Turning to FIG. 2, it is seen that when membrane 30b bursts as under a pressure exceeding hydrostatic pressure, fluid will flow into and be urged into head space 31. Moreover, while it appears that the outer piston wall 26h is flush against housing inner wall 13, there is typically a gap 15 between the outer piston wall 26h and housing inner wall 13 of about 3-5 mil. See Detail A close up FIG. 2. Into this gap, fluid from head space 31 will flow upon membrane rupture. The hydrostatic pressure of the wellbore's fluid on the isolation tool together with the additional pressure applied from the surface presses down on the top of piston 26 and upper ring on O-ring seal set 35. Below head space 31 is space or gap 33. Intermediate bore 19c between upper disk 14 and lower disk 16 is in gaseous communication with gap 33 through unsealed gaps about load ring 24. When isolation tool 10 is assembled at the surface, the air pressure within gap 33 and intermediate bore 19c is atmospheric pressure, approximately 15 psi. This atmospheric pressure is retained in gap 33 and intermediate bore 19c by the tool structure elements sealed by O-ring seal sets 27/34/35, as well as those adjacent lower disk 16. The atmospheric pressure in gap 33, pressing up on the bottom of piston 26, is substantially less than the pressure of the wellbore's fluid pressing down on the top of piston 26. The downward fluid pressure being greater on top of the piston and upper ring on O-ring seal set 35 than the upward pressure on the bottom of the piston and O-ring seal set, the downward (or rightward in horizontal) differential pressure provides an unbalanced force which moves piston 26 to the right from the first position as seen in FIG. 2 toward the position as seen in FIG. 2A.

If gap 33 were sealed and isolated, then movement of piston 26 into gap 33 would, by compressing gap 33, compress the air in it and the compressed air would provide resistance to further downward or rightward movement of piston 26. However, because gap 33 is in gaseous communication with intermediate bore 19c, for practical purposes, there is no pressure material increase within gap 33 because the gas reservoir comprised of intermediate bore 19c is substantially larger than gap 33. Accordingly, the downward gaseous force on piston 26 is not practicably resisted by an upward gaseous force on piston 26.

In some configurations and operations, tool 10 may be operated without lower disk 16. In this event, the lower fluid pressure from below tool 10 relative to the higher fluid pressure from above tool 10 provides sufficient differential downward pressure to push piston 26 downward.

The FIG. 3 series as well as FIGS. 6 and 6A show the structure and function of finger assembly 44. Finger assembly 44 is comprised of multiple fingers 36/38/40 and load ring 24, finger assembly 44 fitting within housing interior walls 13 as shown, for example in FIG. 6. It is seen with reference to FIGS. 3E1, 3F and 3G, for example, that there are three bevels on the fingers: head bevel 36h (FIG. 3E1), chisel head bevel 36k (FIG. 3F) and chisel inner face 36l (FIG. 3G). Bevel 36h may be referred to as a head bevel and generally matches the bevel 26a at the leading edge of the piston. Bevel 36h is typically less than about 45° and greater than about 0°, and preferably about 15°. The function of bevel 36h is to cooperate with a piston bevel 26a to allow piston 26 to push finger 36 from its first to its second position. Bevel 36k seen in FIG. 3F may be referred to as the chisel head bevel and is typically less than about 70-80° and more than about 10-20°, and preferably about 50°. The function of the chisel head bevel is, in conjunction with the about 70 mil nose width and the chisel inner face bevel 36l of FIG. 3G, to concentrate the force of piston 26 forcing the fingers inward on disk cylindrical section 14a with a tip sufficiently small to concentrate its x-axis force on a small enough surface area of the frangible disc's cylinder wall to crack, puncture or break the cylinder wall, but large enough not to be bent or deflected by the cylinder wall, as for example may occur if the thickness of the tip were only about 1 or 2 mil. The combination of bevel 36k and bevel 36l have a continued chisel effect as the cracking, puncturing or breaking commences at a small spot at the tip and continues. Angled chisel head exploits the initial crack, puncture or break by wedging further into it to further crack, puncture or break the cylinder wall. This structure and process uses the limited additional pressure applied from the surface through the wellbore fluid to isolation tool 10 to progressively and sequentially completely collapse upper frangible disk 14.

Neck 36c is thick enough and strong enough to hold the finger in tool 10 during operations and is thin enough and frangible enough to permit it to selectively bend or snap when piston 26 forces the fingers from the first to the second position, see FIG. 6A. This enables the piston's limited power to be used to push the finger tip into the cylinder wall rather than being used to bend neck 36c. Indent 36m helps the head of the piston to bend or break and secure belt O-ring 25, see FIG. 5. Belt O-ring helps hold the fingers in position on load ring 24 during assembly of load ring 24 into housing 12 while the tool is being put together.

Turning to FIGS. 4 and 6, it is seen that load ring 24 has an inner diameter D inner and outer diameter D outer. D outer is sized to allow it to rest against or adjacent the housing inner walls 13 as seen in FIG. 2, excepting the walls' defining notch 24d. D inner is sized to be about the same as the inner diameter of cylindrical section 14a of upper disc 14. The outer diameter of the fingers when resting on the load ring assembly in the first position is sufficient to load the finger assembly into housing 12 and may be about 30 mil or less than the inner diameter of housing 12 at the point where finger assembly 44 rests as seen in FIGS. 6 and 6A.

FIGS. 4, 6, and 6A illustrate the relationship between the fingers and load ring 24. Load ring 24 has a base 24a, with inner surface 24c and outer surface 24d. Leading edge 28a of cartridge 28 seats against removed end dividers 24b, which stand upward from base 24a as they are slightly higher by a few mil (or about 10 to 20 mil) than the tips of the fingers when the fingers are resting on the load ring as seen in FIG. 6. In one embodiment, dividers 24b are about 20 mil higher than the upper tips of the fingers so cartridge 28 strikes dividers 24b. The heads 36a of the fingers are seen to be thicker than dividers 24b as seen in FIG. 6A, so the sliding piston engages the heads and avoids striking the dividers. Load ring 24 has a seat 24f to receive a base 14c of disk 14 as seen in FIGS. 4 and 6. FIG. 3A shows base 36b of a finger 36. FIG. 3E1 shows notch 36g. FIG. 6 illustrates how base 36b and notch 36g engage land 24e of load ring 24.

One preferred embodiment has a load ring having fifteen fingers. Other embodiments may have a different number of fingers. Generally, the fewer fingers, the larger the fingers will be, and the more fingers, the smaller the fingers will be. The fingers on a load ring may be spaced and arranged symmetrically about the cylinder wall. Equally spacing the fingers about the cylinder wall may most reliably fully collapse the disk. More robust disks may require larger and stronger fingers.

From the description and figures herein it is seen that upon the borehole fluid's pressure exceeding the rupture pressure of rupture membrane 30b, rupturable membrane 30b ruptures. The borehole fluid enters rupture membrane assembly 30 and enters head space 31. The borehole fluid pressure in tool head space 31 exerts a downward pressure on the top of piston 26 which is greater than the upward pressure on the bottom of piston 26. The positive downward pressure differential pushes piston 26 downward.

As the force from above piston 26 pushes it downward on a y axis, its beveled leading edge 26a comes into contact with each first finger bevel 36h of first fingers 36. Downward moving piston beveled leading edge 26a pushes further downward on a y-axis between interior wall 13 and each of the first finger first beveled edges 36h. This causes piston's beveled leading edge 26a to downwardly wedge between interior wall 13 and first finger beveled edge 36h. Because interior wall 13 is immovable, downwardly wedging piston 26 exerts an inward x-axis force on each first finger beveled edge 36h, forcing each first finger 36 inward toward upper frangible disc cylinder wall 14a. Continued downward movement of piston beveled leading edge 26a further forces each first finger head 36a to wedge further inwardly against upper frangible disc cylinder wall 14a, ultimately causing each first finger head 36a to penetrate cylinder wall 14a. Thus, the downward movement of piston 26 causes each first finger head 36a to create a hole or break in cylinder wall 14a.

The angle of piston beveled leading edge 26 relative to a y-axis is preferably between about 0° and about 45°. Such an angle converts sufficient force from the Y-axis downward moving piston 26 into x inward direction force against the fingers to force the fingers' heads inwardly against frangible disc cylinder wall 14a. More preferably, the angle is between about 10° and about 20°. Most preferably, the angle is about 15°.

The finger's bevel angle will be about the reciprocal or complement of the piston beveled leading edge 26 angle. For example, if the piston beveled leading edge 26 angle is about 15°, then the finger bevels angle will preferably be about 75°.

As the force from above piston 26 pushes piston 26 further downward, its beveled leading edge 26a comes into contact with each second finger bevel 38h. Downward moving piston beveled leading edge 26a pushes further downward on an y axis between interior wall 13 and each of the second finger first beveled edges. This causes piston's beveled leading edge 26 to downwardly wedge between interior wall 13 and second finger beveled edge. Because interior wall 13 is immovable, downwardly wedging piston 26 exerts an inward x-axis force on each second finger beveled edge, forcing each second finger inward toward upper frangible disc cylinder wall 14a. Continued downward movement of piston beveled leading edge 26a further forces each second finger head 38a to wedge further inwardly against upper frangible disc cylinder wall 14a, ultimately causing each second finger head to penetrate cylinder wall 14a. Thus, the further downward movement of piston 26 causes each second finger head to create a hole in cylinder wall 14a.

As the force from above piston 26 pushes piston 26 further downward, its beveled leading edge 26a comes in the contact with each bevel of third finger 40. This results in each third finger 40 head penetrating cylinder wall 14a with the same process as described above with the first fingers and second fingers.

In some early embodiments, the limited available y-axis downward force on piston was found to be insufficient, when be converted into x-axis inward force, to simultaneously cause enough fingers to puncture enough holes in frangible disc cylinder wall 14a to cause frangible disc 14 to completely collapse. The structure and method of the described embodiment converts the limited available y-axis downward force on piston 26 into a sufficient amount of x-axis inward force on first fingers 36 to cause their angled tips to initially crack, puncture or break frangible disc cylinder walls 14a and then exploit the initial injury by further wedging into the cylinder walls, and then sequentially convert the limited available y-axis downward force on piston 26 into a sufficient amount of x-axis inward force on second fingers 38 to do the same, and then sequentially convert the limited available y-axis downward force on piston 26 into a sufficient amount of x-axis inward force on the third fingers 40 to do the same, the cracks, the holes and breakage sequentially punched in cylinder walls 14a being cumulatively sufficient to cause frangible disc 14 to completely collapse.

An additional challenge addressed in some of the disclosed embodiments is that actual wellbore fluid hydrostatic pressure on a particular isolation tool in a particular well may vary from the expected pressure. For example, sometimes the isolation tool will be placed at a depth other than the depth projected before beginning drilling operations. Some of the disclosed embodiments permit the isolation tool to be modified at the well site so it will more reliably open responsive to a selected differential hydraulic pressure applied to the wellbore's static hydrostatic pressure on the isolation tool as determined at the well site.

In an embodiment, rupturable membrane assembly or fittings 30 is preferably provided in a kit or set of such assemblies, each separate assembly having a rupturable membrane, the collection of assemblies providing membranes which rupture at approximately 500 PSI increments. These fittings are sometimes called pressure activated devices or PADS. Some such fittings that may be used are available from Fike Corporation, Blue Springs, Mo., and may be accurate within ±2% of burst (rupture) pressure.

The fingers are preferentially comprised of a steel which is strong enough to penetrate the frangible disc and most preferably will bend or break at neck 36/38/40c to wedge the fingers' tip against the cylinder wall at an angle most useful for cracking or penetrating the cylinder wall. In one embodiment, the fingers are comprised of 21/40 steel.

The description and figures show that empty space or void is provided below the fingers. As the piston moves downward and breaks the fingers inward toward the frangible disc, the fingers break and are pushed into the void. This results in the fingers of being more preferably angled for penetrating the disk.

Figure 10:
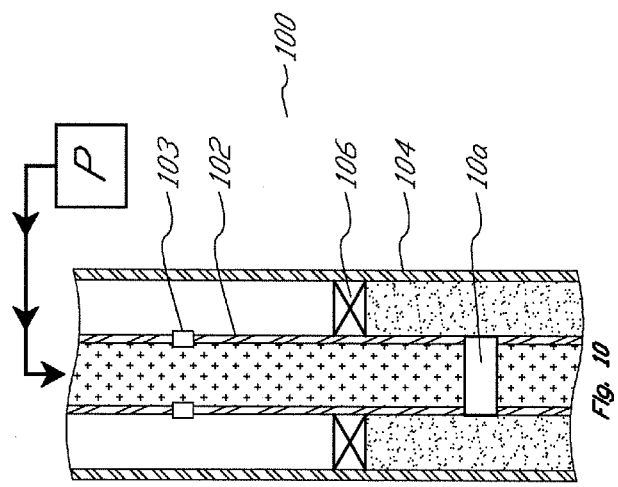

FIG. 10 illustrates a wellbore environment in which tubing 102 having joints 103 is pushed within casing 104. Isolation tool 10a may be part of the tubing string. The "a" in 10a indicates that the isolation tool is part of a tubing string rather than a casing string 10b. In the wellbore environment illustrated in FIG. 10, there are a number of scenarios in which Applicant's isolation tubing may be used. For example, in snubbing, wherein tubing is pushed into the casing, fluid is behind the set tool. Once the tubing is fixed with hangers in the casing, tool 10a may be loaded with pressure that exceeds the hydrostatic pressure on upper disk 14, which pressure also exceeds the membrane rupture pressure, causing rupture of disk 14 allowing fluid flow through tubing 102.

In another scenario, tool 10a may be set below a packer 106 and used to pressure up above tool 10a at a pressure exceeding hydraulic pressure required to set packer 106. After packer 106 is set, hydrostatic pressure can be increased by a pneumatic pump P, for example to a pressure exceeding tool 10's membrane rupture pressure, causing rupture of disk 14 and allowing fluid to flow through the tubing.

In another scenario for wellbore environment 100, pressure may be run up in the tubing above tool 10 and leakage at joints detected either by pressure drops in the tubing above tool 10a or pressure change in the annulus. When pressure testing joints, a number of tools 10a may be set sequentially. They may be set as tubing is run in to sequentially test the joints.

Figure 11B:
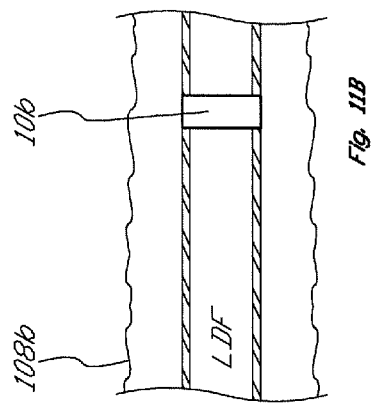
FIGS. 10, 11A and 11B illustrate two wellbore environments and associated methods or wellbore operations which may use Applicant's tools.
Figure 11A:
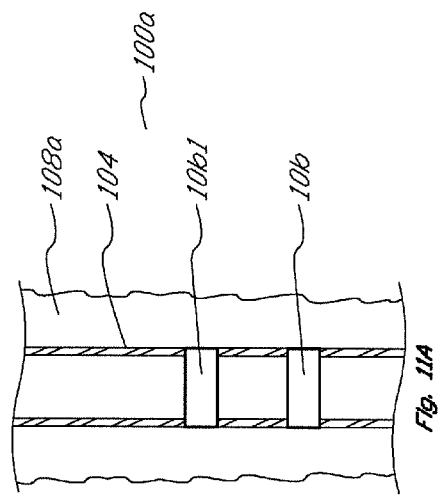

FIGS. 11A and 11B illustrate a second wellbore environment 100a, wherein tool 10b is used, tool 10b adapted to engage the casing as it is run in wellbore 108a and 108b. FIG. 11A illustrates a vertical section of the well and FIG.

11B is a well which also has a horizontal leg. Applicant's tool 10*b* may be set, or several may be set out or near, the front of the tubing string as illustrated in FIG. 11A, with backups 10*b*1 in case the hydrostatic pressure in the vertical well breaks tool 10*b*, tool 10*b*1 is a backup. In FIG. 11B, a tool 10*b* is placed near the front end of the casing in a horizontal well and a low density fluid LDF may be used behind the tool inside the casing to "float" the casing into the horizontal wellbore 108*b*. By floating the casing in, drag is reduced. Float collars and shoes may be used as known in the art or other suitable tools may be used as known in the art. Following float in, pressuring up low density fluid LDF above the rupturing membrane pressure, the fluid communication in the casing may be restored. Pump P may be used to apply additional pressure above the calculated or measured hydrostatic pressure at the tool depth, the additional pressure to break the membrane and operate the piston as set forth herein.

Figure 12A:
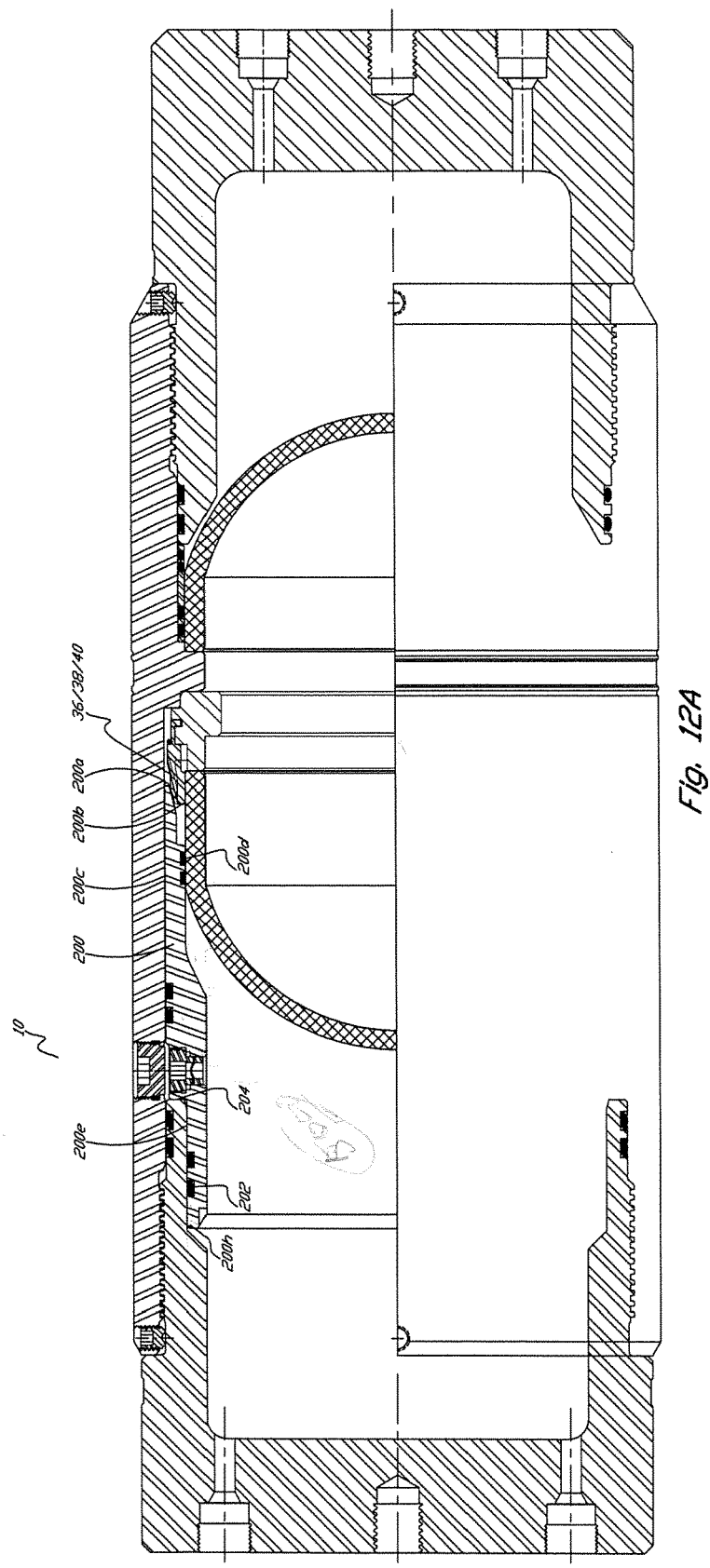
FIGS. 12A (first position) and 12B (second position) are partial cutaway side views of an alternate preferred embodiment of the interventionless tool without the piston cartridge.
Figure 12B:
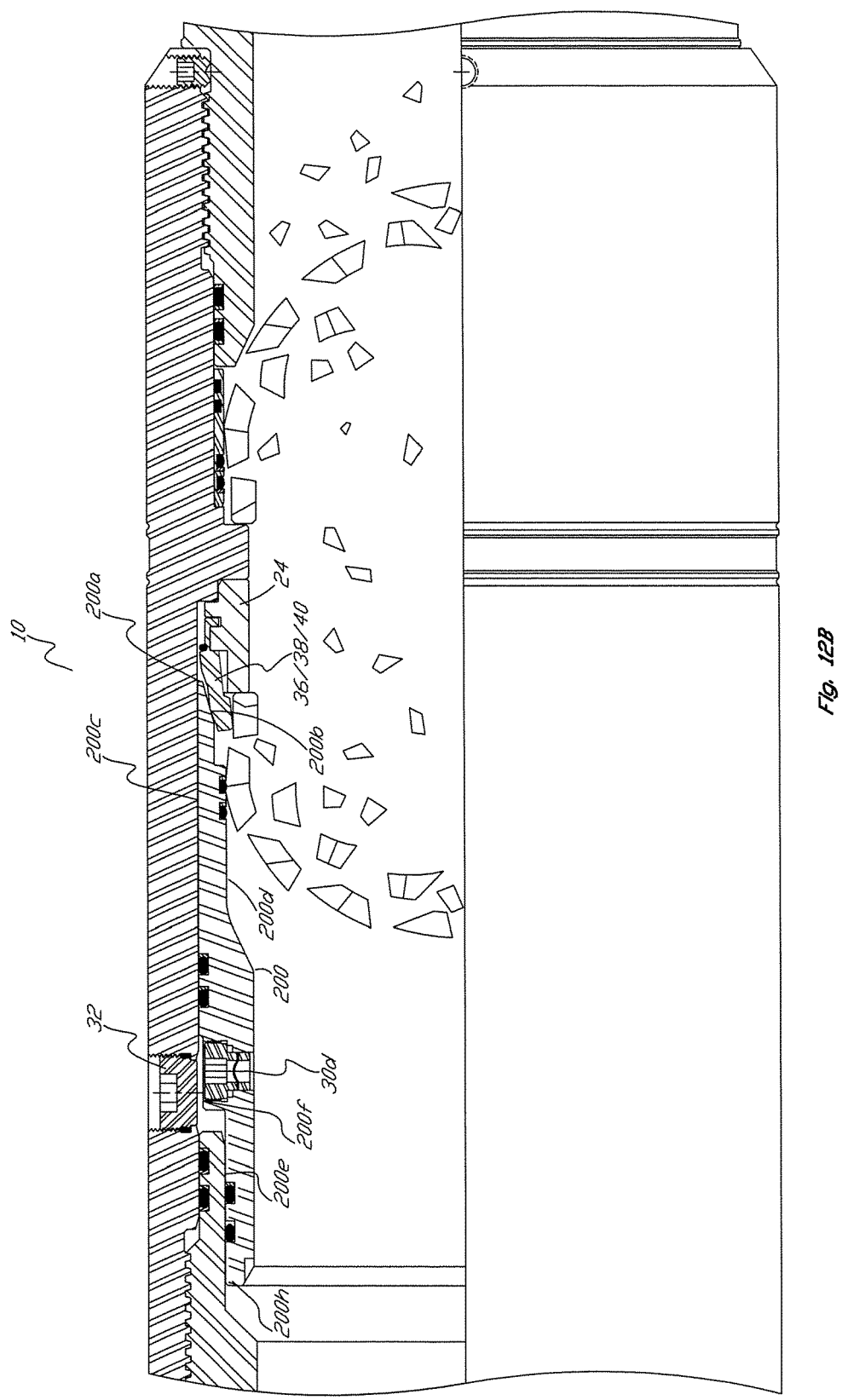

FIGS. 12A and 12B illustrate a preferred embodiment. In this embodiment, one that is especially helpful in higher pressure applications (such as about 4000 to 20,000 psi), the piston assembly does not use a cartridge, instead having only a piston 200 with multiple "O" rings.

Figure 13:
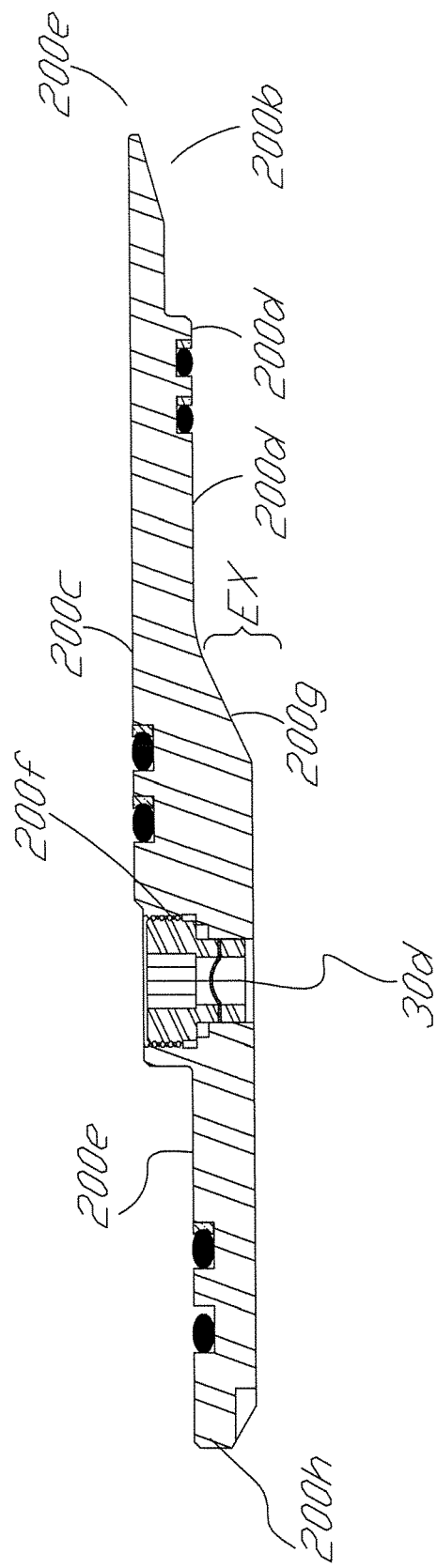
FIG. 13 is a cross-sectional view of the piston of the alternate preferred embodiment illustrated in FIGS. 12A and 12B.

FIGS. 12A, 12B, and FIG. 13 illustrate piston 200 having a beveled leading edge 200*a* with a bevel faced 200*b* on a sloped inner surface thereof. During piston activation, bevel face 200*b* engages fingers 36/38/40 as set forth in the earlier embodiment. Piston 200 includes on part of the cylindrical outer surface, a bearing surface 200*c*, which engages the cylindrical interior walls of housing 12 as set forth in the earlier embodiments, and may include O-rings 202 (second O-ring is a backup O-ring). Bearing surface 200*e* has an upper edge 200*h* that opens to the bore interior which is, as is seen, exposed to hydrostatic pressure above upper frangible disk 14. Bearing surface 200*d* includes, at least in part, a bearing surface which contacts the outer walls of ledge or cylindrical section 14*a* and may include one or more O-rings 202. Walls defining a threaded section 200*f* are provided for receipt of rupturable membrane assembly 30 in the piston 200.

The interior diameter of the piston 200 at bearing surface 200*d* is slightly greater than the outer diameter of bearing surface 200*e*. This causes an exposure Ex of slope section 200*g* to be greater than the horizontal exposure at upper edge 200*h*. Because of this slight difference, hydrostatic loading on the upper surface of upper frangible disk 14 (before rupture) will cause a slight force upward (away from the upper disk) of piston 200. This upward pressure will be prevented by shoulder 204 of housing 12 from allowing much or any pre-rupture shift in the piston 200. A perfect pre-rupture balance would be suitable, but is hard to achieve and, desiring no downward pressure until the membrane bursts, machining in a slight upward bias by a slight difference in the OD/ID will allow for a slight upward pressure during pre-rupture hydrostatic loading.

As can be seen in FIGS. 12A and 12B, when rupturable membrane 30*d* bursts, the borehole fluid comes into the head space and in fluid communication with piston 200 putting borehole fluids hydrostatic pressure on piston 200. Responsive to borehole fluid's hydrostatic pressure, piston 200 moves downward, that is, moving to the right from the position seen in FIG. 12A. This downward piston movement is converted into an inward transverse force on the nose section of the fingers, causing them to pivot inward against the columnar or the cylindrical section 14*a* of the disk and forcing them inward against and through the cylindrical section, causing breakage of the disk.

While in a preferred embodiment, the three different fingers 36/38/40 above have different geometries as set forth herein, in some embodiments all the fingers may have the same geometry. Two different fingers, instead of three may be used. The fingers may be any suitable number, but in one range, there are twelve to fifteen fingers. Disk 14 may be made from ceramic or other suitable breakable material. In this embodiment, load ring 24 does not require the divider 24*b* to be larger than the fingers as there is no cartridge, so no cartridge standoff function is necessary.

In the embodiment illustrated in FIGS. 12A and 12B, the height of the upper frangible disk 14, the cylindrical section thereof, is greater than the height of the lower frangible disk 16. This allows a greater pivoting torque, as well as greater distance for the piston to slide as it moves from the left to the right across distance D1. In one range, the length of the cylindrical section is between about 2.375" and 4.325". In one embodiment, piston movement from its first to second position is in the range of about 0.625 to 1.000 inches or at least about 0.625 inches.

Figure 14B:
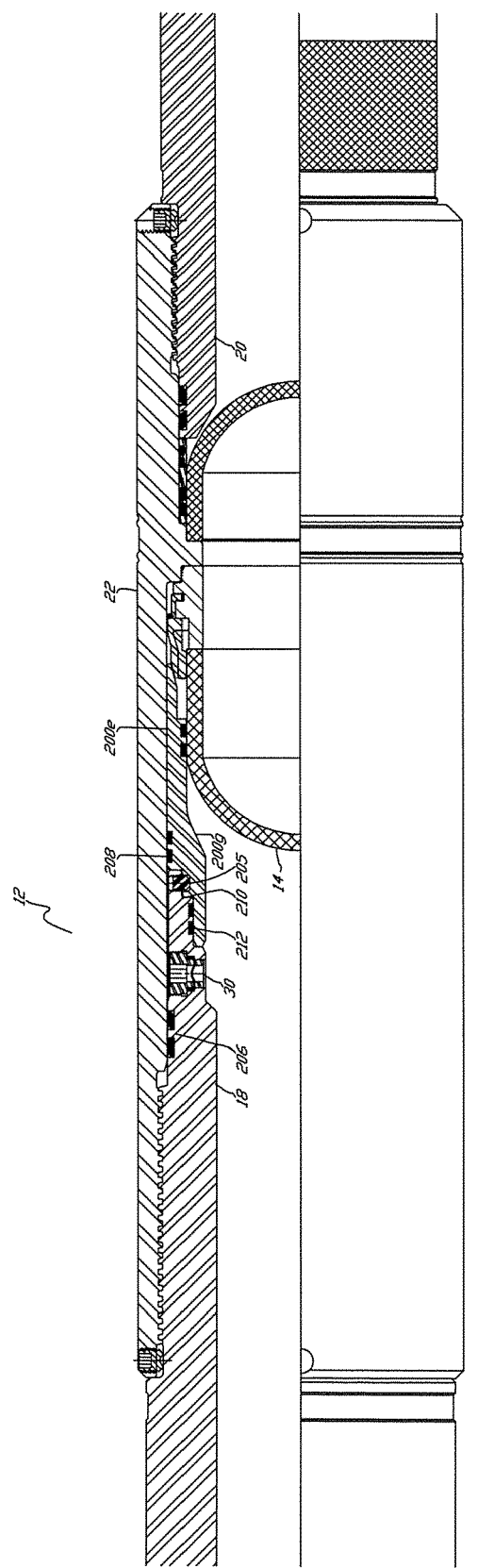
FIGS. 14A (apart) and 14B (assembled) illustrate quarter sectional views of a tool with a change in the location of the rupturable membrane assembly when compared to previous embodiments disclosed.

FIGS. 14A and 14B illustrate a slightly different arrangement of the second embodiment. FIGS. 14A and 14B illustrate that there is no access plug (see element 32, FIG. 2) to access rupture member assembly 30. A shear screw 205 (for example, brass) is located on the top end of piston 200 to help secure it to the inner walls of the housing during assembly, shipping and handling, but otherwise does not affect the operation of the tool or the piston. Note also location of rupture member assembly 30 (Fike) is directly in walls of upper coupling 18. Moreover, one or more upper coupling O-rings 206 may be provided uphole of the location of rupture assembly 30 as seen in FIG. 14B. One or more O-rings 208 may be provided between the outer walls of piston 200 on bearing surface 200*e* and sealing against the inner walls of the housing as seen in FIG. 14B. Understanding the location of O-rings 206, 208 and the hydrostatic pressure on the upper disk, upon rupture at rupture assembly 30 will enter chamber 210 and is confined by isolated therein by one or more O-rings 208, 210 and 212. It is apparent (compare the upstream cross-sectional area forcing the piston down and the downstream cross-sectional area 200*g*) when the rupture assembly 30 breaks, the piston will move downward and shatter upper disk 14. This alternate preferred embodiment may be used for thinner walled pistons such as 2⅜", 2⅞" and 3½" casing.

Single disk (the upper frangible disk only) embodiments used typically used when an isolation tool, for example, a pump out plug, is below plug 10 to prevent fluid from reaching the top disk. This prevents fluid from below the top disk interfering with its operation. Sometimes, however, plug 10 is unprotected from the zone below it. A dual disk embodiment is a temporary isolation tool which, in addition to his upper frangible disk, also has a lower frangible disk. The lower frangible disk prevents borehole fluid from entering plug 10 from below plug 10, through it and upward to interfere with the function of the piston/fingers mechanism by providing a counterbalancing upward and outward force on the piston and providing a counterbalancing upward and outward force on the upper disk.

Applicant's tool isolates wellbore reservoir pressure in a variety of downhole conditions. The tool may be run as an isolation barrier on the bottom of the tubing and/or below a packer VHA to isolate the tubing to set hydraulic set packers. After all tests are performed, a predetermined activation pressure is applied at the surface to remove the disks as set forth herein. Once the disks are removed, the wellbore fluids can then be produced up the production tubing. This eliminates the need for intervention with a slip line or coiled tubing. It is more accurate than slip line or coiled tubing, up to ±2 absolute pressure value. The rupturable membrane may be changed out in the field to adjust actuation values. In one operation, the tool is used as a barrier to set hydraulic packers. In another operation, it may be used to float casing or liners into horizontal wellbores. After the disk has been removed, there is floor bore opening to the tubing or casing ID. the tool is an economic alternative to profile nipple with a plug, and eliminates plug and prong removal runs. It is available with seals and CRA materials for use in hostile environments, such as H2S and CO2. It can be run in heavy muds and is temperature rated up to 400° F. Due to the fully effective fracturing of the dome, there is little or no interfering debris left in the wellbore. The well can be pressure tested prior to and after insulation. The tool may be used in snubbing applications in live wells, as long as the pressure control company and/or operator have procedures in place to secure and control the well in the unlikely event of tool failure. Some pressure isolation tools which use a pressure disk for zonal isolation release by dropping a go-devil into the wellbore to open the tool by the go-devil rupturing the pressure disk. A problem with such tools is that the go-devil may merely puncture the dome, or fracture only a portion of it, leaving the tool's bore partially obstructed. Another problem with such tools is the dome's fragments may be large, interfering with completion and production. Another problem is go-devils may accumulate in a lower bend in the wellbore, interfering with completion and production. Another problem is go-devils are not feasible in horizontal runs of the wellbore. In contrast, the described tool, with its multiple transverse fingers, does not require use of a go-devil, and thoroughly fractures the dome into numerous small fragments, thus completely opening the tool's bore for production and completion, and producing only small fragments of the dome which do not interfere with production and completion.

Figure 15:
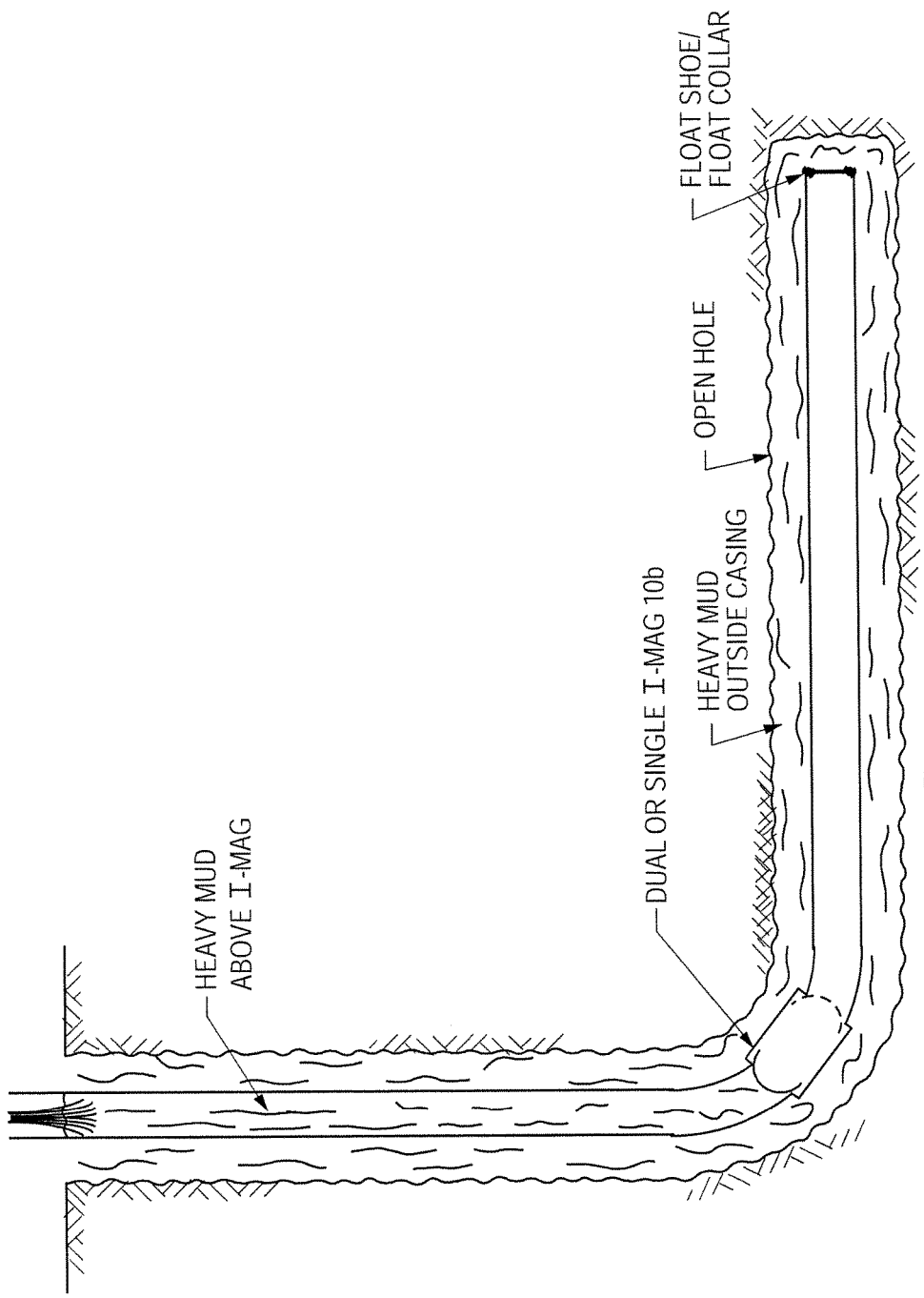

FIG. 15 illustrates the use of applicant's interventionless (dual or single disk) tool 10b used as part of a casing string in a wellbore that is horizontal and has been drilled out. FIG. 15 illustrates the use of applicant's tool in floating in casing in a horizontal section. In this application, heavy mud would typically be found outside the casing and in the casing above the tool, with air in the casing below the tool. Typically at the removed end of the casing string, a float shoe and a float collar will be located, with the casing run into the open wellbore and the air providing some buoyance to float the casing in FIGS. 16A-16C illustrate the use of applicant's tool 10a used as part of a tubing string, namely a sub near the removed end of a tubing string. A tubing string may be run in hole with a hydraulic set packer and applicant's tool as a sub on the tubing (See FIG. 16A). FIG. 16B illustrates pressure up against the tool to set the hydraulic packer, such pressure being below the membrane pressure of tool 10a. FIG. 16C illustrates continuing pressure up to at or above the membrane pressure to activate the disk and remove it to allow fluid flow in communication through the tubing and to the well casing below.

FIGS. 17A-17D illustrate applicant's tool 10a run in a cased hole or wellbore on a wire line setting tool as part of a bottom hole assembly here including a packer. FIG. 17A illustrates the packer before it is set. A tail pipe may be provided below the packer into which the isolation tool 10a is placed before run in. FIG. 17B illustrates the setting tool pulled out of hole with the wire line and the well isolated after the packer is set. FIG. 17C illustrates the tubing string run in hole with the tubing string engaging the packer and in fluid communication with the tail pipe and isolation tool. FIG. 17D illustrates pump up of pressure above isolation tool 10A, above the membrane pressure to cause membrane rupture and the removal of the disk as set forth herein. The term "wellbore" means either a cased or uncased hole.

While measured numerical values stated here are intended to be accurate, unless otherwise indicated the numerical values stated here are primarily exemplary of expected values. Actual numerical values in the field may vary depending upon particular structures, compositions, properties, and conditions sought, used, and encountered. While the subject of this specification is described in connection with one or more exemplary embodiments, it is not intended to limit the claims to the particular forms set forth. Further, the specific embodiment is not meant to be construed in a limiting sense. On the contrary, various modifications of the disclosed embodiments will become apparent to those skilled in the art upon reference to the description of the invention. On the contrary, the appended claims are intended to cover such alternatives, modifications, and equivalents as may be included within their spirit and scope.

The invention claimed is:
1. A downhole well isolation tool comprising:
a housing having an upper end and a lower end, the housing having an exterior wall and having an interior wall, the housing defining a bore having a bore axis;
an upper frangible disk, the frangible disk having an outer wall and an inner wall, a cylindrical section and a generally hemispherical dome, the upper frangible disk engaging the inner wall of the housing, wherein the dome is convex when viewed from the upper end of the housing, the frangible disk in an unbroken state substantially blocking the bore, and defining an upper bore above the frangible disk and a lower bore below the frangible disk;
a finger assembly comprising multiple fingers, each finger having a first position and a second position, at least a portion of some of the multiplicity of fingers adjacent the frangible disk cylindrical section outer wall when in the first position and inward from the first position when in the second position;
a piston assembly engaging the housing interior wall, the piston assembly comprising a piston and "O" rings engaged therewith, the piston including a piston wall, the piston slideable with respect to the housing interior wall and the fingers of the finger assembly between a first, uphole position and a second, downhole position;
a rupturable membrane assembly having a rupturable membrane, the rupturable membrane assembly in fluid connection with the upper bore, the rupturable membrane capable of rupturing at a membrane rupture pressure;
a head space defined by a portion of the housing interior wall and a portion of the piston wall and sealing elements there between, the head space not in substantial fluid communication with the upper bore before the membrane ruptures and in fluid communication with the upper bore when the membrane ruptures;
wherein the piston is moveable from the first position toward the second position, responsive to rupture of the rupturable membrane; and
wherein the movement of the piston toward the second position causes the piston to force at least some of the fingers from the first position to the second position and into the cylindrical section of the upper frangible disk with sufficient force to break the frangible disk and unblock the bore.

2. The tool of claim 1, wherein the finger assembly includes a load ring engaging the fingers, the upper frangible disk, and the housing.

3. The tool of claim 2, wherein the load ring includes a base and dividers.

4. The tool of claim 2, wherein the load ring includes a first seat for receiving a base of the upper frangible disk and a second seat for engaging the housing.

5. The tool of claim 1, wherein the fingers of the finger assembly are configured to cause the piston sliding toward the second position to contact at least some of the fingers sequentially.

6. The tool of claim 1, wherein the fingers of the finger assembly include a head, neck, and base.

7. The tool of claim 6, wherein the head includes an inner face defining a chisel inner face bevel.

8. The tool of claim 6, wherein the head includes a head bevel.

9. The tool of claim 6, wherein the head includes a chisel head bevel.

10. The tool of claim 2, wherein the load ring contacts the outer wall of the cylindrical section of the upper frangible disk and the interior walls of the housing and wherein the fingers include a bevel.

11. The tool of claim 10, wherein a bevel of some of the multiple fingers is configured differently than the bevel of other of the multiple fingers to sequentially respond to movement of the piston from the first to the second position.

12. The tool of claim 1, wherein the rupturable membrane assembly directly and fluid sealingly engages the walls of the piston.

13. The tool of claim 1, wherein the rupturable membrane assembly directly and fluid sealingly engages the walls of the upper end of the housing.

14. The tool of claim 1, further including a lower frangible disk.

15. The tool of claim 1, wherein the piston is coated and the piston travel is at least about 0.625 inches.

16. The tool of claim 15, wherein the coating contains a lubricant.

17. The tool of claim 1, wherein the cylindrical section of the upper frangible disk has a length of at least about 3.75".

18. The tool of claim 1, wherein the piston assembly includes a cartridge.

19. The tool of claim 1, wherein the rupturable membrane of the rupturable membrane assembly is configured to rupture between about 4000 and about 20,000 psi.

20. A method for operating a wellbore, the method comprising the steps of:
  (a) providing a pump;
  (b) providing a pressure isolation tool, the tool comprising:
    a housing having a bore;
    a frangible disk, the frangible disk blocking the bore in an unbroken condition, having an outer surface and an inner surface and a dome and cylindrical section, the dome being transverse to the bore;
    a piston assembly comprising a slideable piston, the piston assembly engaging the housing and the frangible disk, the slideable piston configured to move to a second position from a first position; and
    a multiplicity of fingers around the disk, the fingers located at least partially between the piston and the cylindrical section of the disk;
    a head space defined by the piston and housing; and
    a rupturable membrane, located so rupture of the membrane places the head space in fluid communication with the bore, the rupturable membrane having a membrane rupture pressure;
  (c) placing the pressure isolation tool at a preselected depth in the wellbore;
  (d) loading the bore and the outer surface of the frangible disk and the rupturable membrane with a fluid having a first hydrostatic load which is below the membrane rupture pressure of the rupturable membrane; and
  (e) applying with the pump, an additional load to the first hydrostatic load, the additional load, plus the hydrostatic load being a second hydrostatic load which exceeds the membrane rupture pressure, ruptures the membrane and acts upon the slideable piston, causing the slideable piston to move toward the second position, thereby pushing the fingers toward the frangible disk and breaking the frangible disk, thereby opening the bore for fluid to pass therethrough.

21. The method of claim 20, wherein the placing step includes placing the pressure isolation tool in either casing or a tubing string.

22. The method of claim 20, wherein the additional load is between about 500 psi and 3,000 psi.

23. The method of claim 20, wherein the membrane rupture pressure is between about 2,500 psi and 21,000 psi.

24. The method of claim 20 further including the step of providing at least two rupturable membranes, wherein the rupturable membranes differ from one another by having different membrane rupture pressures.

25. The method of claim 24 further including selecting one of the provided different membranes having a membrane rupture pressure which is more than the expected first hydrostatic load and less than the expected second hydrostatic load, and engaging it with the pressure isolation tool before the placing step.

26. A tool for temporarily isolating zones in a wellbore, comprising:
  a housing having a bore;
  a frangible seal within the bore, comprising a dome and a cylinder, the dome transverse to the bore, convex from above the seal, and in an unbroken state blocking fluid from flowing downward from an upper wellbore zone above the tool through the bore to a lower wellbore zone below the tool, the cylinder in an unbroken state supporting the dome against the upper zone's fluid's first hydrostatic pressure on the dome from the upper zone of the wellbore;
  a piston located at least in part between the housing and the cylinder, the piston axially movable between the housing and the cylinder, the piston having an upper face;
  a rupturable membrane in fluid communication with the bore above the dome and the upper face of the piston, the membrane rupturable at a second hydrostatic pressure on the membrane which is less than a third hydrostatic pressure on the tool, which third hydrostatic pressure of the upper zone's fluid would rupture the dome, rupture of the membrane putting the upper face of the piston in fluid communication with the upper zone of the wellbore;
  a multiplicity of fingers located at least in part about an outer face of the cylinder;
  wherein the tool is capable of isolating the lower zone in the wellbore below the tool from the upper zone in the wellbore above the tool and ending the isolation upon upper zone fluid hydrostatic pressure exceeding the second hydrostatic pressure, rupturing the membrane, allowing upper zone fluid to flow through the ruptured membrane and hydrostatically push the piston axially downward, the downward moving piston causing the fingers to move transversely inward, the inward moving fingers breaking the cylinder, causing the dome to break, the broken dome opening the bore, permitting fluid communication between the upper zone of wellbore and the lower zone of the wellbore.

27. The tool of claim 26, wherein the fingers comprise a first set of fingers and a second set of fingers, the first set of fingers arranged and configured to be pushed by the piston into the cylinder before the second set of fingers is pushed by the piston into the cylinder.

28. The tool of claim 27, wherein the axially downward force on the upper face of the piston required to sequentially push the first set of fingers through the cylinder, and then push the second set of fingers through the cylinder, is less than the force required to push all of the fingers through the cylinder at the same time.

29. The tool of claim 28, wherein the first set of fingers comprises at least three fingers and the second set of fingers comprises at least three fingers.

30. The tool of claim 26, wherein the piston has an inward upper sloping face, and at least some of the fingers are axially adjacent the cylinder and have one or more outer bevels, the piston and the fingers located and configured so the inward upper sloping face of the axially downward moving piston wedges the outer bevels of the fingers transversely inward to push the fingers into the cylinder.

31. The tool of claim 30, wherein the membrane has a rupture pressure greater than an expected first upper zone fluid hydrostatic pressure on the tool when the tool isolates zones in the wellbore, and less than an expected second higher upper zone fluid hydrostatic pressure on the tool, so the second hydrostatic pressure ends zone isolation.

32. The tool of claim 31, wherein the tool is configured to accept alternative membranes having different rupture pressures, and to accept a selected membrane immediately before the tool is placed in the wellbore.

33. The tool of claim 32, wherein at least some of the fingers have a head with a chisel shaped bevel face which is capable of more easily breaking through the cylinder than a blunt shaped face.

34. The tool of claim 26, further comprising a head space defined at least in part by an inner side of the housing, an outer side of the piston and an "O" ring, the head space being in fluid communication with the membrane and an upper face of the piston before the membrane ruptures, and in fluid communication with the wellbore above the tool and the upper face of the piston after the membrane ruptures.

35. The tool of claim 31, further including a head space wherein the head space is configured to accept alternative membranes having different rupture pressures.

36. The tool of claim 26, further including a lower frangible seal located below the upper frangible seal, the lower frangible seal isolating the piston from upward hydraulic fluid pressure on the tool from the wellbore zone below the tool, wherein an upper zone fluid having a sufficient hydrostatic pressure to rupture the upper frangible seal flows downward through the tool and ruptures the lower frangible seal.

37. The tool of claim 26, wherein the cylinder is at least about 3.75 inches in length.

38. The apparatus of claim 26, wherein the rupturable membrane is configured to rupture between about 2,500 and about 21,000 psi.

39. A method of temporarily isolating zones in a wellbore, comprising:
placing a temporary isolation tool in a wellbore to isolate a lower wellbore zone below the tool from an upper wellbore zone above the tool, the tool comprising:
a housing having a bore;
an upper frangible seal within the bore, comprising a dome and a cylinder, the dome transverse to the bore, convex from above the seal, and blocking fluid from flowing downward through the bore, the cylinder supporting the dome against a first upper zone hydrostatic pressure on the dome when the tool is used to isolate zones in the wellbore;
a piston having an upper face, the piston located at least in part between the housing and the cylinder, the piston axially movable between the housing and the cylinder;
a rupturable membrane between the bore above the upper frangible seal and the upper face of the piston, the membrane rupturable responsive to a second hydrostatic pressure on the membrane which is greater than the first upper zone hydrostatic pressure and which is less than a third upper zone hydrostatic pressure on the tool which third upper zone hydrostatic pressure would rupture the dome, rupture of the membrane putting the upper face of the piston in fluid communication with the upper zone;
a multiplicity of fingers located at least in part about an outer face of the cylinder;
using upper zone fluid to place the first hydrostatic pressure on the upper frangible seal of the tool;
increasing the upper zone hydrostatic pressure on the tool to the second hydrostatic pressure, thus exceeding the membrane's rupture pressure and rupturing the membrane; and
flowing upper zone fluid through the ruptured membrane to the upper face of the piston
using the hydrostatic pressure of the upper zone fluid to push the piston axially downward;
using the axially downward moving piston to push the fingers transversely inward;
using the transversely inwardly moving fingers to break the cylinder; the broken cylinder's ceasing to support the dome against upper zone hydrostatic pressure causing the dome to break responsive to hydrostatic pressure of the upper zone fluid on the dome, the broken dome opening the bore to permit fluid communication between the upper zone and the lower zone through the open bore.

40. The method of claim 39, wherein the tool of the placing step is configured such that the axially downward moving piston begins to push a first set of fingers transversely into the cylinder before the piston begins to push a second set of fingers transversely into the cylinder, wherein the downward force required to sequentially begin to push the first set of fingers through the cylinder, and then begin to push the second set of fingers through the cylinder, is less than the force required to push all of the fingers through the cylinder at the same time.

41. The method of claim 40 wherein the tool of the placing step is configured so the length of the downward stroke of the piston required to sequentially push the first and second sets of fingers is longer than the length of the stroke of a similar piston, but which similar piston has sufficient power to push, and pushing a single set of fingers.

42. The method of claim 40, wherein the first set of fingers comprises at least three fingers and the second set of fingers comprises at least three fingers.

43. The method of claim 40, wherein the piston has an inward upper sloping face, at least some of the fingers are axially adjacent the cylinder and have one or more outer bevels, and the piston and fingers are located and configured so the upper sloping face of the axially downward moving piston wedges the outer bevels of the fingers transversely inward to push the fingers axially inward into the cylinder, and wherein at least some of the fingers have a head with a chisel shaped bevel face which is capable of more easily breaking through the cylinder than a blunt shaped face.

44. The method of claim 39, wherein the tool of the placing step is configured so the membrane's rupture pressure is greater than the expected first upper zone fluid hydrostatic pressure on the tool when the tool isolates zones in the wellbore, and less than the third upper zone fluid hydrostatic pressure on the tool needed to rupture the dome.

45. The method of claim 44, wherein the rupturable membrane of the tool is configured to rupture between about 2,500 and about 21,000 psi.

46. The method of claim 44, wherein the tool has a head space defined at least in part by an inner side of the housing, the rupturable membrane, and the upper face of the piston, wherein the head space is in fluid communication with the membrane and the upper face of the piston before the membrane ruptures, and in fluid communication with the upper zone and the upper face of the piston after the membrane ruptures, the tool configured to accept alternative rupturable membranes having different rupture pressures, and the method further includes the steps of selecting and attaching to the housing a membrane having a rupture pressure above the expected first upper zone fluid hydrostatic pressure on the tool and less than the upper zone fluid hydrostatic pressure on the tool needed to rupture the dome.

47. The method of claim 46, wherein the selecting and attaching of the membrane to the housing occurs after the tool arrives at the wellbore's wellsite and before the tool is placed in the wellbore.

48. The method of claim 44, the tool further including a lower frangible seal located below the upper frangible seal, the lower frangible seal isolating the piston from upward hydraulic fluid pressure on the tool from the wellbore zone below the tool, wherein an upper zone fluid having a sufficient hydrostatic pressure to rupture the upper frangible seal flows downward through the tool and ruptures the lower frangible seal.

49. The method of claim 39, wherein the placing step includes placement in a horizontal wellbore.

50. The method of claim 49, further including the step of floating in casing.

51. A method of temporarily isolating zones in a wellbore, comprising:
  setting a temporary isolation tool in a wellbore to isolate a lower zone below the tool from an upper zone above the tool, the tool comprising:
  a housing having a bore;
  an upper frangible seal, comprising a dome and a cylinder, the dome transverse to the bore, convex from above the seal, and blocking fluid from flowing downward through the housing bore, the cylinder supporting the dome within the housing bore;
  a piston located at least in part between the housing and the cylinder, the piston axially movable between the housing and the cylinder;
  a membrane between the bore above the upper frangible seal and an upper face of the piston, the membrane rupturable responsive to a upper zone hydrostatic pressure on the membrane which is greater than the upper zone fluid hydrostatic pressure on the tool when the tool is used to isolate zones in the wellbore and less than the upper zone fluid hydrostatic pressure on the tool needed to rupture the dome, and within the range of about 2,500 and about 21,000 psi, rupture of the membrane putting the upper face of the piston in fluid communication with the upper zone; wherein the membrane's rupture pressure is greater than the expected first upper zone fluid hydrostatic pressure on the tool when the tool isolates zones in the wellbore, and less than the upper zone fluid hydrostatic pressure on the tool needed to rupture the dome;
  a head space defined at least in part by an inner side of the housing, the membrane, and an upper face of the piston, wherein the head space is in fluid communication with the membrane and the upper face of the piston before the membrane ruptures, and in fluid communication with the upper zone and the upper face of the piston after the membrane ruptures, the head space configured to accept alternative membranes having different rupture pressures, and the method includes selecting and attaching to the housing a membrane having a rupture pressure above the expected first upper zone fluid hydrostatic pressure on the tool and less than the upper zone fluid hydrostatic pressure on the tool needed to rupture the dome;
  fingers located at least in part about an outer face of the cylinder, wherein the fingers comprise a first set of fingers having at least three fingers and the second set of fingers having at least three fingers, at least some of the fingers axially adjacent the cylinder and having one or more outer bevels configured so the transversely downward moving piston wedges the outer bevels of the fingers axially inward, and at least some of the fingers have a head with a chisel shaped bevel face capable of more easily breaking through the cylinder than a blunt shaped face;
  using the tool to isolate a lower zone below the tool from an upper zone above the tool, the upper zone wellbore fluid placing a first hydrostatic pressure on the tool, the first hydrostatic pressure being less than the dome's rupture pressure and less than the membrane's rupture pressure;
ending isolation of the upper zone from the lower zone by:
  increasing the upper zone's hydrostatic pressure on the tool to a second hydrostatic pressure on the tool which exceeds the membrane's rupture pressure and ruptures the membrane;
  flowing upper zone fluid through the ruptured membrane to the upper face of the piston;
  using the hydrostatic pressure of the upper zone fluid to push the piston axially downward;
  using the axially downward moving piston to push a first set of fingers transversely into the cylinder before the piston pushes a second set of fingers transversely into the cylinder, wherein the downward force required to sequentially push the first set of fingers through the cylinder, and then push the second set of fingers through the cylinder, is less than the force required to push all of the fingers through the cylinder at the same time;

lack of support from the broken cylinder causing the dome to break responsive to hydrostatic pressure of the upper zone fluid on the dome, the broken dome opening the bore; and permitting fluid communication between the upper zone and the lower zone through the open bore.

52. The method of claim 51, wherein the using step includes using the tool to float in casing.

53. The method of claim 51, wherein the using step includes using the tool as part of a tubing string BHA.

54. The method of claim 53, wherein the tubing string BHA includes a packer.

55. The method of claim 20, wherein the fluid of the loading step is heavy mud and the wellbore includes casing with a floating end in a horizontal section thereof.

56. The method of claim 55, wherein the horizontal section includes a float shoe or float collar in a tail of the casing.

* * * * *